US005640189A

United States Patent [19]

Ohno et al.

[11] Patent Number: 5,640,189

[45] Date of Patent: Jun. 17, 1997

[54] IMAGE FORMING APPARATUS USING AN ELECTRODE MATRIX TO FORM A LATENT IMAGE

[75] Inventors: Tadayoshi Ohno, Kawasaki; Naruhito Yoshida, Yokohama; Koji Tanimoto, Kawasaki; Rintaro Nakane, Yokohama, all of Japan

[73] Assignee: Kabushiki Kaisha Toshiba, Kanagawa-ken, Japan

[21] Appl. No.: 124,727

[22] Filed: Sep. 21, 1993

[30] Foreign Application Priority Data

Sep. 25, 1992 [JP] Japan .................................... 4-279210

[51] Int. Cl.[6] .................................. B41J 2/41; B41J 2/39; B41J 2/395; G11B 3/00

[52] U.S. Cl. .............................. 347/141; 347/55; 347/112

[58] Field of Search ..................................... 347/115, 116, 347/117, 114, 112, 142, 141, 55; 346/74.3

[56] References Cited

U.S. PATENT DOCUMENTS 4,620,203 10/1986 Nakatani et al. ........................ 347/112
4,646,163 2/1987 Tuan et al. .............................. 358/300
4,666,801 5/1987 Kimura et al. ............................ 430/33
4,737,805 4/1988 Weisfield et al. ....................... 347/125

FOREIGN PATENT DOCUMENTS 60-90357 5/1985 Japan .

*Primary Examiner*—Benjamin R. Fuller
*Assistant Examiner*—Raquel Yvette Gordon
*Attorney, Agent, or Firm*—Limbach & Limbach

[57] ABSTRACT

Capacitors 32 connected to their corresponding matrix-shaped picture elements 33 are connected to an image forming unit 20 on which an electrostatic latent image is formed. Switching elements 31 are also connected to the image forming unit 20. When the switching elements 31 are made conductive, their corresponding capacitors 32 are charged from a power source arranged outside, and a potential appears in each of their corresponding picture elements 33. Therefore, the electrostatic latent image can be more stably formed on these matrix-shaped picture elements over a time period which is determined by time constant. AS the result, electrostatic latent image formation can be achieved without using any ozone-generating pre-charger. In addition, the electrostatic latent image forming unit can keep its toner holding force even after the developing process to enable an image to be more reliably and clearly reproduced.

9 Claims, 10 Drawing Sheets

F I G. 6A
F I G. 6B
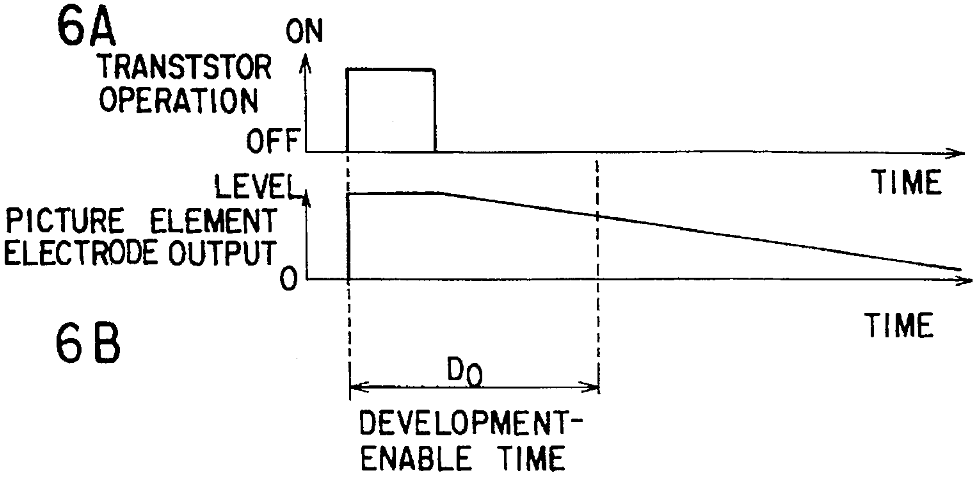
F I G. 7A
F I G. 7B
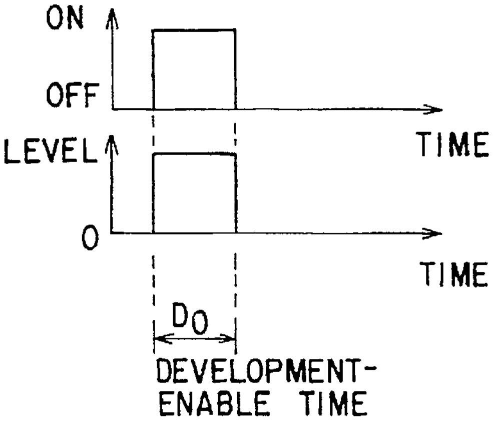
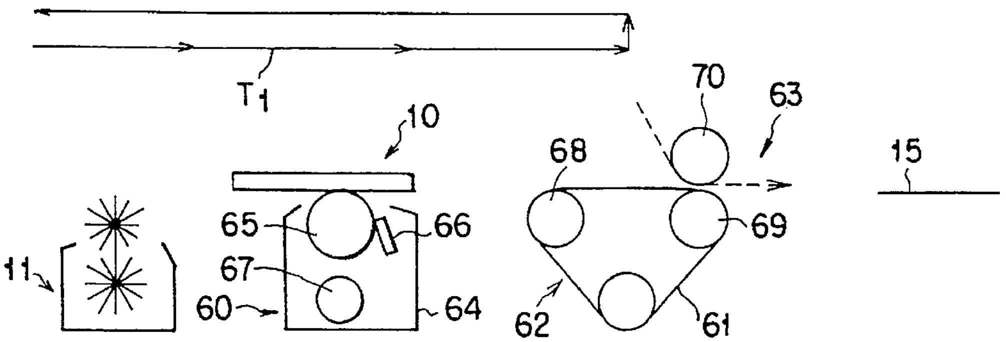
F I G. 8

FIG. 11A HORIZONTAL SYNCHRONIZING SIGNAL
FIG. 11B STEPPING MOTOR PHASE CHANGING SIGNAL
FIG. 11C CLEAR
FIG. 11D VALUE COUNTED
FIG. 11E Y1
FIG. 11F Y2
FIG. 11G Y3
FIG. 11H YM
FIG. 11I DATA
FIG. 11J CLOCK
FIG. 11K DATA
FIG. 11L CLOCK
0
1
2
3
M
FIRST LINE MADE ACTIVE
SECOND LINE MADE ACTIVE
FIRST LINE DATA
SECOND LINE DATA
THIRD LINE DATA
1
N
1

IMAGE FORMING APPARATUS USING AN ELECTRODE MATRIX TO FORM A LATENT IMAGE

BACKGROUND OF THE INVENTION

1. Field of the Invention

The present invention relates to an image forming apparatus which can form an electrostatic latent image without performing a precharging process, and can develop the image with developer into a visible image on a hard copy.

2. Description of the Related Art

Image forming apparatus which perform electronic photographing operate at high speed and low running cost and form high-quality images. For these advantages, they are used widely.

In most image forming apparatus performing electronic photographing, a corona charger pre-heats the photosensitive member, electrically charging the surface of the photosensitive member. Then, the light reflected from an original image is applied to the photosensitive member. The photosensitive member is discharged at those surface regions exposed to the light. The other surface regions which remain electrically charged define an electric charge image. Toner is applied to the surface of the photosensitive member and is to the electrically charged regions only, forming a visible image. The visible image is transferred onto a recording medium and subsequently fixed thereon, thus forming a hard copy of the original image.

Recently, copying machines and page printers, which perform electronic photographing, have been used in increasing numbers. They generate ozone while the photosensitive member is being pre-heated. If ozone leaks from the machines or printers, it is harmful to persons who are using them. Strict rules and regulations on ozone leakage have been come into effect in order to protect the users of copying machines and page printers. It is therefore strongly demanded that an image forming apparatus be developed which generates no ozone.

To meet this demand, an image forming method has been proposed in, for example, Jpn. Pat. Appln. KOKAI Publication No. 62-127853. In this method, an electric charge image is formed without electrically charging the photosensitive member before the member is exposed to the light reflected from an original image. More specifically, a pixel-electrode plate 1 shown in FIG. 1 is used in place of a photosensitive member. The plate 1 comprises a substrate 2, pixel electrodes 3 formed on the substrate 2 and arranged in rows and columns, and field-effect transistors (FETs) 4, each connected to one pixel electrode 3.

Each of the FETs 4 comprises a gate electrode 5 formed on the substrate 2, a gate insulating film 6 coated on the substrate 2 and the gate electrode 5, a semiconductor layer 7 formed on the film 6 and aligned with the gate electrode 5, a source electrode 8 connected to one end of the layer 7, and a drain electrode 9 connected to the other end of the layer 7. The drain electrode 9 is connected to the pixel electrode 3 associated with the FET 4, which is formed on the gate insulating film 6. The source electrode 8 is connected to the ground. The gate electrode 5 is connected to a driver circuit, which generates gate signals in accordance with image signals.

The pixel-electrode plate 1 is used to form a visible image identical to an original image, in the following way.

All pixel electrodes 3 are connected to ground, while all FETs 4 remain in operative state. Then, a bias voltage is applied to the pixel electrodes 3 by using a magnetic brush. Toner is applied to the plate 1, forming a thin layer having a uniform thickness on each pixel electrode 3. Developing electrodes, each having an insulated surface, are placed close to the pixel electrodes 3. A developing voltage is applied from the developing electrodes to the pixel electrodes 3. In this condition, gate signals are supplied to the gate electrodes 5 of the FETs 4 which have been selected in accordance with the image signals. The selected FETs 4 are thereby turned on, while the unselected FETs 4 remain off. An electric field is generated between the pixel electrode 3 connected to any selected FET 4 and the developing electrode facing this pixel electrode 3. This is because the pixel electrode 3 is connected to the ground. The pixel electrode 3 applies charge to the toner particles on it. The charged toner particles fly onto the developing electrode. Meanwhile, no magnetic field is generated between the pixel electrode 3 connected to any unselected FET 4 and the developing electrode facing this pixel electrode 3, and no toner particles are attracted to this pixel electrode 3. As a result, a toner image, which is visible, is formed on the developing electrodes.

The image forming method described above includes no pre-heating step and can form images on recording media, without generating ozone. In the method, however, a toner image must be formed within the operating time of the selected FETs 4. The operating time of each selected FET 4 is very short since all selected FETs 4 must be turned on within a short period, one after another. The higher the image-forming speed, the shorter the operating time of each FET 4. Each selected FET may be no longer operating before a sufficient amount of toner moves to the developing electrode, even if the magnetic field generating region is relatively large.

To make matters worse, the developing electrodes may fail to hold toner particles firmly since the associated pixel electrodes 3 come to have no electric potential once the FET 4 connected to the electrode 3 is turned off. Consequently, the toner image may be unstable.

Furthermore, the image forming method may increase the running cost of any apparatus employing the method. As is known in the art, the total area of the toner-holding developing electrodes is only 10% of the total area of all developing electrodes in the case of forming a page of document, and at most 50% of the total area of all developing electrodes in the case of forming a drawing. Hence, only a small part of the toner applied is actually used to form an image. The greater part of the toner needs to be recollected and re-used. In practice, however, a portion of the toner not used cannot be recollected and wasted, increasing the toner consumption and ultimately increasing the running cost of the apparatus performing this image forming method.

SUMMARY OF THE INVENTION

The object of the present invention is therefore to provide an image forming apparatus capable of forming an electrostatic latent image without using the ozone-generating precharge, keeping the toner holding force of the electrostatic latent image forming unit enough even after the developing process, and more reliably and clearly reproducing an image to be recorded.

According to the present invention, there can be provided an image forming apparatus for forming an image based on an image data, comprising a plurality of electrodes; means for supporting the electrodes two-dimensionally; a plurality of capacitors connected between each of the electrodes and the ground; means for receiving the image data; means, connected to each of the capacitors, applying a predetermined electric voltage to the electrodes corresponding to the image data received by the receiving means so as to form an electrostatic latent image on the electrodes; and means for developing the latent image on the electrodes.

According to the present invention, there is also provided an apparatus for forming an image based on an image data, comprising an insulating layer; a plurality of field-effect transistors formed like a matrix on a face of the insulating layer; means, connected to each of the field-effect transistors, for applying a predetermined electric voltage to the field-effect transistors; capacitors connected between each of the transistors and the ground; electrodes arranged like a matrix on another face of the insulating layer, connected to each of the transistors, inserted between the transistors and the capacitors; means for receiving the image data to be formed; means for selectively matrix-driving the transistors, responsive to information to be recorded so as to form an electrostatic latent image on the electrodes by the electric voltage from the applying means; and means for developing the electrostatic latent image.

According to the image forming apparatus of the present invention, hard copy creation starting from forming an electrostatic latent image and ending with transferring toner to the recording medium can be achieved without generating any ozone or while reducing the amount of ozone generated to a greater extent. In addition, electrostatic latent image potential can be contrasted as desired, independently of whether or not the toner image is present on the electrostatic latent image forming unit, and toner images can be developed on the pre-developoed toner image or on the electrostatic latent image forming unit. Further, capacitors are connected to the picture element electrodes on which the electrostatic latent image is formed. Potential in each of the picture element electrodes can be thus made more stable and the electrostatic latent image can be more reliably formed and developed by toner, independently of an application time in which signal is applied to gate electrodes of the transistors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A and 6B are wave form diagrams intended to explain how the electrostatic latent image forming unit in FIG. 4 is made operative to form electrostatic latent images;

FIGS. 7A and 7B are wave form diagrams intended to explain how the electrostatic latent image forming unit in FIG. 4 is made operative to form electrostatic latent images;

FIG. 8 schematically shows the structure of the image forming apparatus according to another embodiment of the present invention;

DETAILED DESCRIPTION OF THE PREFERRED EMBODIMENTS

Embodiments of the image forming apparatus according to the present invention will be described in detail with reference to the accompanying drawings.

Figure 2:
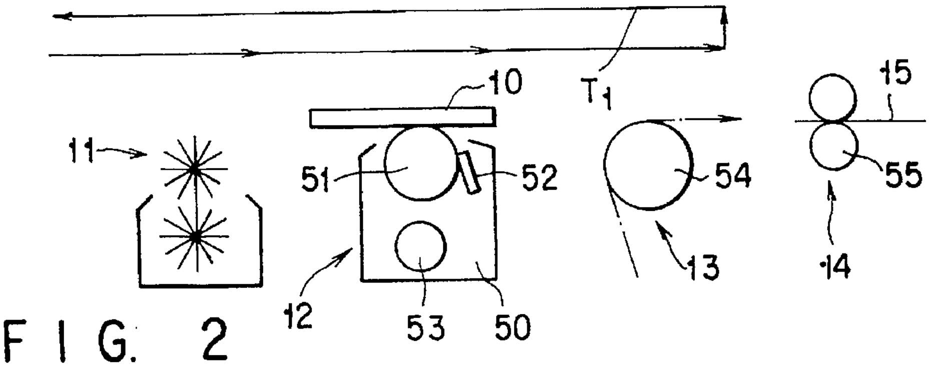
FIG. 2 schematically shows the structure of the image forming apparatus according to an embodiment of the present invention.

FIG. 2 schematically shows the image forming apparatus according to an embodiment of the present invention. Reference numeral 10 represents an electrostatic latent image carrier which will be described later, 11 a fur brush cleaner for cleaning toner from the electrostatic latent image carrier 10, 12 a developing unit of the contact type which serves as developing means and uses non-magnetic one component toner, 13 a transferring roller which serves as toner transferring means, 14 a heat roller which serves as fixing means, and 15 a sheet of common paper which serves as an image-formed medium.

Figure 3:
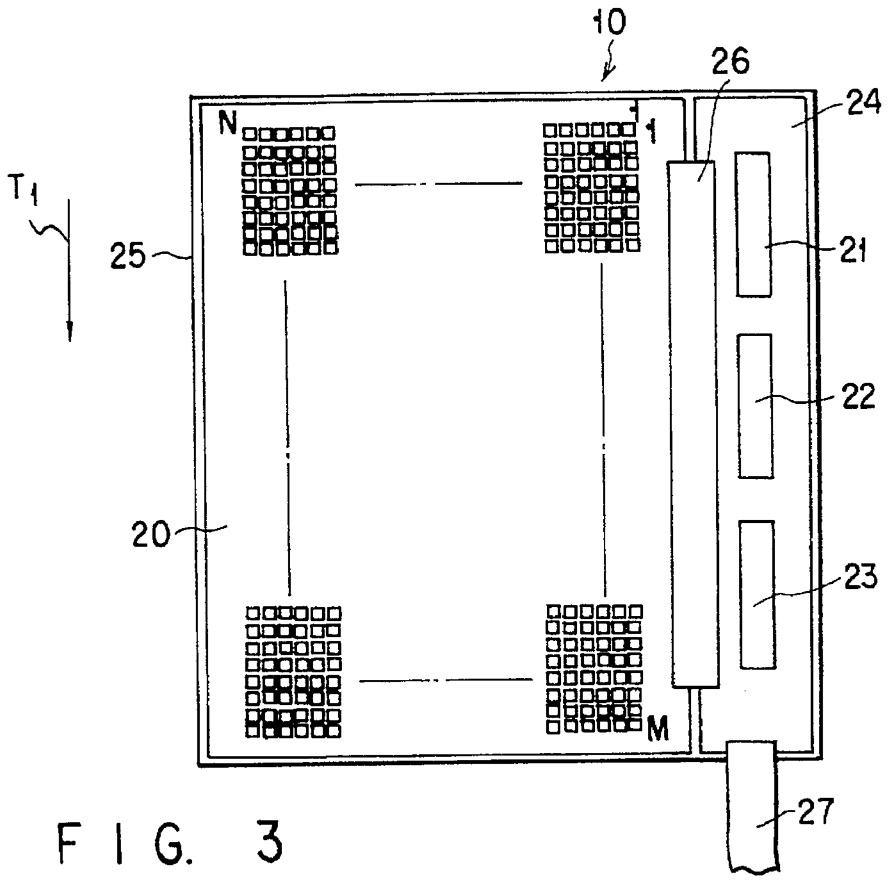
FIG. 3 is a plane view schematically showing an electrostatic latent image carrier of the image forming apparatus in FIG. 2.

As shown in FIG. 3, the electrostatic latent image carrier 10 comprises an electrostatic latent image forming unit 20 and a drive circuit plate 24 both of which are arranged on a support 25. Picture elements each comprising a field-effect thin film transistor 31 which will be described later, a capacitor 32 and a picture element electrode 33 are arrange in a matrix to form the electrostatic latent image forming unit 20. A data storing section 21 comprising a shift register and a latch circuit for storing image data to be applied to the transistors 31, a transistor selecting section 22 comprising a selector and a counter for selecting transistor lines, and a driver section 23 for matrix-driving the transistors 31 are arranged on the drive circuit board 24. The electrostatic latent image forming unit 20 is connected to each section of the drive circuit board 24 by a lead line 26 and the electrostatic latent image carrier 10 is connected to a power source and circuits arranged outside, through a flexible cable 27. As shown in FIG. 3, the electrostatic latent image forming unit 20 and drive circuit board 24, are arranged in substantially parallel along a direction $T_1$ in which the electrostatic latent image carrier 10 is carried.

The electrostatic latent image forming unit 20 will be described in more detail with reference to FIG. 4. The electrostatic latent image forming unit 20 comprises picture elements of M×N units arranged in a matrix, as shown in FIG. 5, and each of the picture elements comprises the field-effect thin film transistor 31 arranged on a substrate 30, the capacitor 32 interposed between the transistor 31 and ground, and the picture element electrode 33.

The thin film transistor 31 comprises a gate electrode 34 arranged on the plate-like glass substrate 30 made of corning 705 (trade name), for example, a gate insulating film 35 made of $SiO_2$, $Si_3N_4$:H and arranged on the gate electrode 34, a semiconductor layer 36 made of p—Si, a—Si:H and arranged on the gate insulating film 35, a source electrode 37 connected to one end of the semiconductor layer 36, and a drain electrode 38 connected to the other end of the semiconductor layer 36. The gate electrode 34 is connected to a driver circuit 30 which generates gate signal in accordance with an image signal. The source electrode 37 is connected to a recording power source 40.

The capacitor 32 comprises a first electrode 41 formed on the substrate, a dielectric layer 42 formed on this first electrode 41, and a second electrode 43 formed on the dielectric layer 42, opposing to the first electrode 41. The first electrode 41 is connected to the ground and the second one 43 is connected to the drain electrode 38 of the transistor 31 and the picture element electrode 33 arranged on an insulating layer 44.

Figure 4:
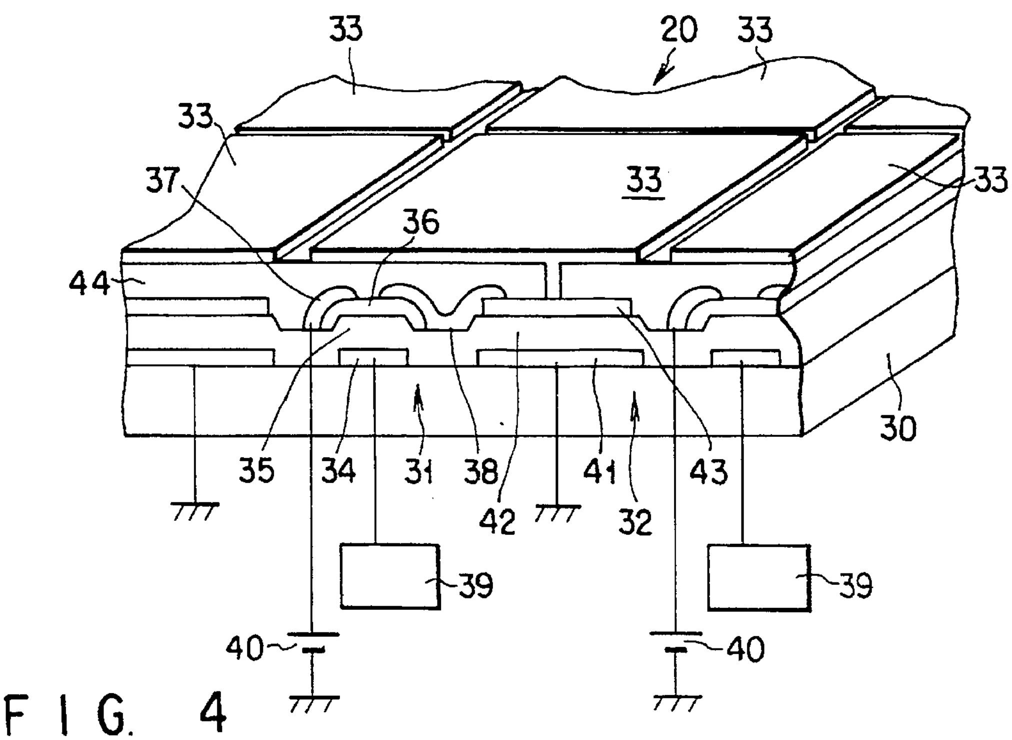
FIG. 4 is a perspective and sectional view schematically showing an electrostatic latent image forming unit which is a main component forming the electrostatic latent image carrier in FIG. 3.
Figure 5:
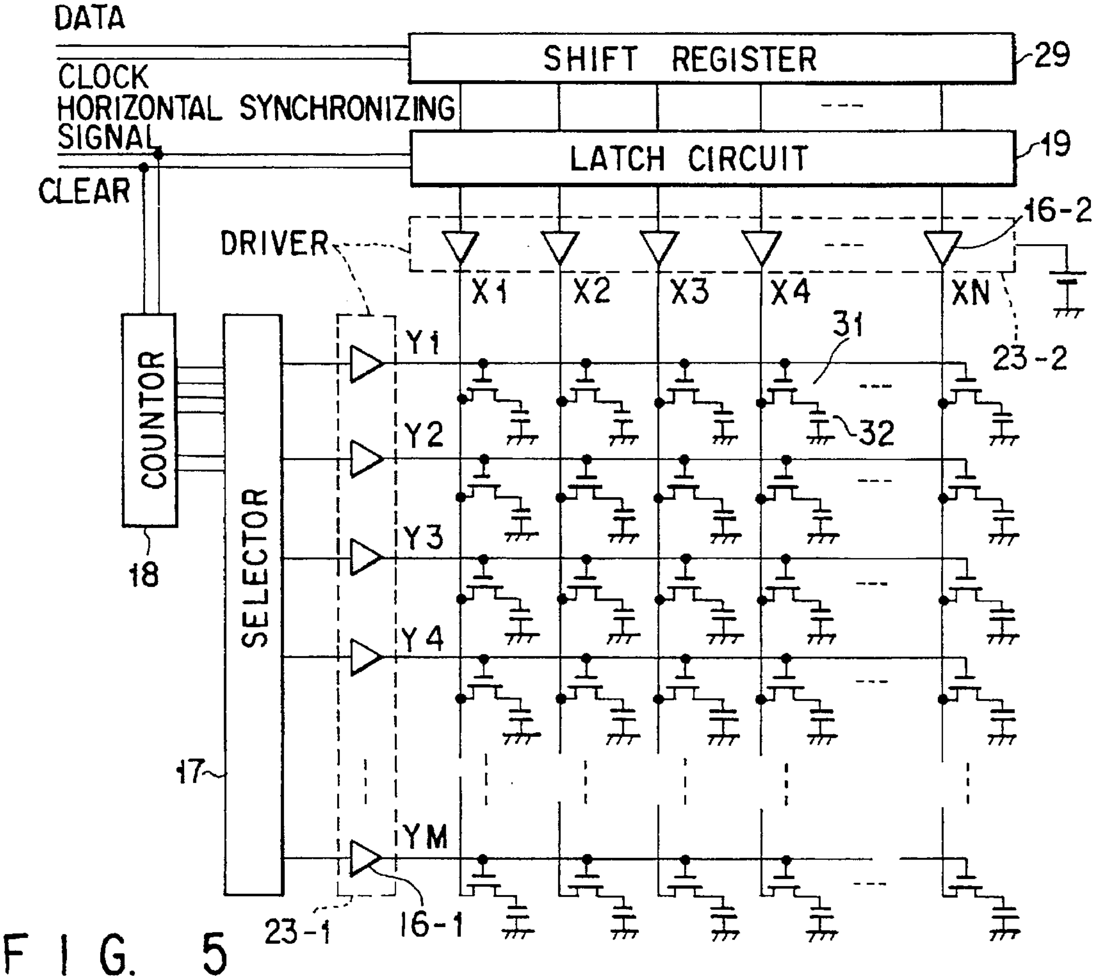
FIG. 5 is a block diagram schematically showing a circuitry of the electrostatic latent image carrier in FIG. 3.

In the case of the electrostatic latent image forming unit 20 shown in FIG. 4, the transistor 31 and the capacitor 32 are inserted in series between the power source 40 and the ground. The picture element electrode 33 is laminated on the transistor 31 and the capacitor 32, sandwiching the insulating layer 44 between them, as shown in FIG. 4, and it has a picture dot of desired size. It is made of metal such as aluminium, tungsten, chromium, titanium and copper which are used as electrode materials for thin film devices. It is particularly useful that the picture element electrode 33 is made of such metal which has a high wear-resisting characteristic, because toner is rubbed against the picture element electrode 33 every time a latent image is to be developed. An insulating protection film may be provided, without preventing a formation of the latent image, on picture element electrodes and the recess between them to form a flat and smooth surface on which the developed image is formed.

The above-described electrostatic latent image forming unit can be made of well-known material according to the well-known technique. The data storing, transistor selecting and driver sections 21, 22 and 23 on the drive circuit board 24 can be made by common ICs or LSIs technique.

FIG. 5 is a block diagram showing equivalent circuit block diagram of the electrostatic latent image carrier. As shown in FIG. 5, the field-effect transistors 31 and the capacitors 32 which are totaled to N×M units are arranged like a matrix. The transistors 31 which are arranged on each line in the traverse or main scanning direction are connected to their common signal line (Y1, Y2, or Y3, - - - ) at their gates. Those which are arranged on each column in the vertical or subscanning direction are connected to their common signal line (X1, X2, or X3, - - - ) at their sources. The drain of each transistor 31 is connected to one end of its corresponding capacitor 32 which is connected to the ground at the other end thereof. Each picture element electrode 33 is connected between the transistor 31 and the capacitor 32 and its potential equals to that of the capacitor 32.

The common signal or scanning line (Y1, Y2, or Y3, - - - ) to which the transistors 31 arranged on each line in the traverse or main scanning direction are connected is connected to its corresponding driver 16-1 in the driver section 23-1 and the driver 16-1 is connected to the selector 17. This selector 17 is connected to the counter 18, which is cleared zero responsive to clear signal and counted up responsive to horizontal synchronizing signal. When the number counted by the counter 18 reaches a predetermined value, the scanning line desired is made active by the selector 17. In short, the scanning line is selected.

The transistors 31 which are arranged on each column in the vertical or sub-scanning direction are connected to their common signal line (X1, X2, or X3, - - - ) at their sources, and this signal line (X1, X2, or X3, - - - ) is similarly connected to its corresponding driver 16-2 in the drive section 23-2. The driver 16-2 is connected to the latch circuit 19, which is connected to the shift register 29 to latch image signals, which cover one column, responsive to horizontal synchronizing signal applied from the shift register 29. An image data signal line and a clock signal line for transferring image data are connected to the shift register 29. Image signals are thus supplied in serial to the shift register 29, synchronizing with a clock.

Providing that resolution is 8 dot/mm and that the area exclusively occupied by picture element electrodes is 200×290 mm, the total of picture element electrodes or transistors will become about 3700,000 units. It is therefore actually impossible to lead signal lines from all of them. In a case where the transistors on a line of the electrostatic latent image forming unit are matrix-driven at the same time as shown in FIG. 5, the driver must be provided every line. Providing that the length of the area in the carrying direction $T_1$ is also 290 mm in this case, about 2300 signal lines must be connected outside. It is quite difficult to lead such a large number of signal lines outside and even if it is possible, it is difficult to smoothly move the electrostatic latent image carrier over a relatively long distance. In addition, the image forming apparatus will lose reliability because these signal lines may be broken while the electrostatic latent image carrier is being moved. In the case of the image forming apparatus of the present invention shown in FIGS. 2 and 5, however, flexible cables 27 for supplying an electrical power and signals, which are extended from the electrostatic latent image carrier 10 and connected to the outside circuit, are 10 or less, because the diver circuit board 24 is provided on the image forming unit 10 and signals are processed in the circuit board 24.

An electrostatic latent image is formed as follows on the electrostatic latent image carrier 10. When the signal line connected to the source of a transistor is made high in level by image data and the signal line connected to the gate thereof is also made high in level by the value counted up by the counter, the drain of this transistor becomes high in level to charge its corresponding capacitor. Capacitor potential thus charged appears in the picture element electrode to which the capacitor is connected. On the contrary, when the signal line connected to the source of the transistor is made low in level by image data, the drain of the transistor is kept low in level even if the signal line connected to the gate of thereof is made high in level by the value counted by the counter. The capacitor is not charged accordingly. Potential appearing in the picture element electrode to which the capacitor is connected is thus made almost zero. Potential differences appearing in this manner in the picture element electrodes are used to form an electrostatic latent image on the electrostatic latent image carrier.

The electrostatic latent image forming operation of the electrostatic latent image forming unit 20 will be described in more detail, referring to FIGS. 6A, 6B, 7A and 7B. FIGS. 6A and 6B show the operation of the electrostatic latent image forming unit used by the image forming apparatus of the present invention. FIGS. 7A and 7B show that in the case of the conventional picture element electrode unit shown in FIG. 1. FIGS. 6A and 7A shows the operation of a TFT transistor and FIGS. 6B and 7B show output appearing in the picture element electrode 33 and a developmentenable time Do. The transistor 31 serves as a switching element. When pulse signal is applied from the driver circuit 39 to the gate electrode 34 responsive to image signal, the transistor is made on-state and connection is established between the source 37 and the drain electrode 38. The voltage of the power source 40 connected to the source electrode 37 is thus added to the capacitor 32, which is thus charged. When the capacitor 32 is charged in this manner, the charged potential of the capacitor 32 appears in the picture element electrode 33 which is connected to the electrode 43 of the capacitor 32. The potential appearing in the picture element electrode can be kept due to the capacitor 32 even if the supply of signal pulse to the gate electrode is stopped. On the other hand, the transistor 31 to which no signal pulse is added is left inoperative not to apply the voltage of the power source to the capacitor 32, which is not therefore charged and potential near to earthed one appears in the picture element electrode. This difference of potentials appearing in the electrodes 43 of the capacitors 32 is used to form an electrostatic latent image on the electrostatic latent image forming unit of the image forming apparatus according to the present invention.

Figure 1:
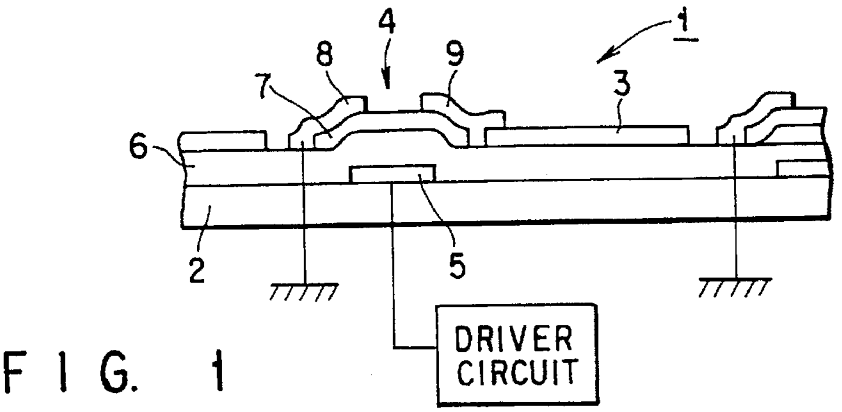
FIG. 1 is a sectional view showing the structure of the conventional picture element electrode plate to explain how electrostatic latent images are formed.

In the case of the electrostatic latent image forming operation achieved by the conventional picture element electrode plate in FIG. 1, the picture element electrode is earthed only when its corresponding transistor is made on-state, as shown in FIGS. 7A and 7B, and electrostatic difference is caused relative to those picture element electrodes whose transistors are not made on-state. In the case of the electrostatic latent image forming operation achieved by the image forming apparatus of the present invention, however, latent image potentials can be kept in the picture element electrodes even after their transistors 31 are made off-state. This enables development-enable time to be set longer than the time during which the transistors 31 are kept on-state. Development can be thus conducted within this development-enable time regardless of the timings at which the transistors 31 are made on-state. In the conventional case, however, development can be conducted only within the time during which the transistors 4 are kept on-state. In the case of the present invention, potentials in the picture element electrodes can be reliably maintained to hold toner even after development. This enables the image forming process to be advanced to the image transferring stage without disturbing the toner image.

The image forming apparatus of the present invention will be again described referring to FIG. 2. As shown in FIG. 2, a developing roller 51 is housed in a hopper 50 of the developing unit 12 to feed non-magnetic one component toner which is charged by friction to that position where toner is opposed to the picture element electrodes of the electrostatic latent image forming unit 10. The developing roller 51 is an elastic one provided with a conductive surface layer having an electric resistance of $10^2$–$10^8$ Ωcm. An elastic blade 52 made of phosphor bronze, urethane, or silicon resin is pressed against the developing roller 51 to friction-charged toner and form thin layers of toner. In short, toner passing between the blade 52 and the roller 51 is charged negative and formed as one or three layers of toner. It is needed that the surface layer of the developing roller 51 is selected to have such elasticity and frictional characteristics as to apply appropriate friction to toner. The developing roller 51 is therefore coated with a mixture in which conductive carbon of 10–30 weight % is mixed an urethane resin. Further, a bias power source (not shown) is connected to the developing roller 51 to add a predetermined developing bias to the roller 51 at the time of development. A sponge-like toner feeding roller 53 is also housed in the hopper 50 to feed and supply toner and to prevent toner from blocking in the hopper 50.

A transferring roller 54 of the image transferring unit 13 is same in structure as the developing roller 51, but its surface layer has an electric resistance of $10^5$–$10^{10}$ Ωcm. In order to easily remove matters such as toner and paper powder, the surface of the transferring roller 54 is preferably made of such material that has surface smoothness and is low in friction. It is made of conductive polyfluoride resin or polyester in this case. When the transferring roller 54 is pressed against the underside of the recording medium and AC bias which has been made to have a polarity reverse to that (−) of toner is added from a power source (not shown) to the roller 54, a toner image can be transferred from the electrostatic latent image forming unit 10 to the recording medium 15 which is carried along a passage shown by a dot and dash line. The amount of ozone generated by the image transferring unit is a several tenths or less, as compared with that generated by the corona charger, and the image transferring unit enables the toner image to be more stably transferred even under quite humid circumstances. Toner which has been transferred on the recording medium 15 is fixed on it by s heat roller 55 of the fixing means 14.

The recording operation of the image forming apparatus according to the present invention will be described referring to FIG. 2. Toner remaining on the picture element electrodes is cleaned by the fur brush cleaner while moving the electrostatic latent image carrier 10 in the direction shown by an arrow at a speed of 15 mm/sec. An electrostatic latent image is formed by the above-described latent image forming operation before the electrostatic latent image forming unit 20 reaches the contact type developing unit 12 in which non-magnetic one component toner is received. In a case where voltage of 50 V is added from the recording power source 39 to the capacitors, the electrostatic latent image formed has an image area potential of about 50 V and a non-image area potential smaller than 10 V. when the electrostatic latent image forming unit 20 reaches the developing region of the developing unit 12, the image area potential becomes about 45 V. This latent image is developed by non-magnetic one component toner which has been electrified negative, but the potential of the latent image is low to develop the latent image. Therefore, toner which can be electrified at a value lower than that of conventional toner is used. For this purpose, toner is mixed with iron powder carrier, for example, to have an electrification of −5 to −10 μC/g when measured according to the blow-off method.

The toner image pressed on the recording medium 15 which has been carried round the transferring roller 54 of the image transferring unit 13 is transferred to it while adding +300 V to the transferring roller 54. The toner image is then fixed on it by the heat roller 55 of the fixing unit 14. After the toner image is transferred to the recording medium in this manner, the electrostatic latent image carrier 10 is returned to its original position.

According to the electrostatic latent image carrier 10 of the image forming apparatus of the present invention, latent image potential can be kept, depending upon the discharge time constant of the capacitors, even after the transistors are made off-state. This enables the development-enable time to be set longer than the time during which the transistors are kept on-state. Development is thus made possible within this development-enable time regardless of the timing at which the transistors are kept on-state. In addition, the potential of each picture element electrode can stably hold toner even after the developing process and this enables the image forming process to be advanced to the image transferring stage without disturbing the toner image. Further, the electrostatic latent image carrier 10 can be carried without any problem and latent images can be stably formed even after the image forming operation is repeated several ten thousand times or more. Furthermore, only the electrostatic latent image forming unit 20 is contacted with the developing roller. However, the drive circuit board provided on the unit 20 along the transfer path of the recording medium is not contacted to the developing roller. Thus, the data storing, transistor selecting and driver sections is not contaminated by toner and this can prevent their operations from becoming disordered.

FIG. 8 schematically shows the image forming apparatus according to another embodiment of the present invention. Reference numeral 10 represents the electrostatic latent image carrier same in structure as that shown in FIGS. 3, 4 and 5. Numeral 11 denotes the fur brush cleaner for cleaning toner from the electrostatic latent image forming unit, 60 a contact type developing unit as developing means, to which conductive and magnetic toner is received, 61 an intermediate transferring unit, 62 a press transferring unit as toner transferring means, 63 fixing means, and 15 the recording medium which is a sheet of common paper. Same components as those in FIG. 2 will be described only when needed, because they function same as in the case of the image forming apparatus shown in FIG. 2.

A conductive developing sleeve 65 is housed in a hopper 64 of the developing unit 60 to feed conductive magnetic toner to that position where toner is opposed to the electrostatic latent image forming unit (not shown) of the electrostatic latent image carrier 10. Developing bias can be applied from voltage applying means (not shown) to the developing sleeve 65. A doctor blade 66 made of phosphor bronze, urethane or silicon resin is pressed against the developing sleeve 65 to make toner thin to form one or three layers of toner. A sponge-like toner feeding roller 67 is also housed in the hopper 64 to feed and supply toner and to prevent toner from becoming blocked in the hopper 64.

The intermediate transferring unit 61 is formed like a belt, whose base is coated with such material that causes toner to adhere to it. More specifically, it is preferable to laminate silicon rubber, 0.1 to 0.8 mm thick, on a base film, 0.1 to 1.0 mm thick, made of polyamide or polyester. The rubber hardness of the intermediate transferring unit 61 is preferably in a range of 30° to 40°, considering the adhering capacity of toner relative to the intermediate transferring unit 61. The surface of the intermediate transferring unit 61 may be made of any heat-resistance material which can cause toner to adhere to the unit 61.

The press transferring unit 62 which transfers toner from the electrostatic latent image carrier 10 to the intermediate transferring unit 61 has a press roller 68. When a pressure of 0.2–1.0 Kgf/cm is added to the press roller 68, toner on the electrostatic latent image forming unit 20 can be completely transferred to the intermediate transferring unit 61. If necessary, a cleaner may be provided to remove remaining toner from the intermediate transferring unit 61.

The press transferring unit 62 enables toner transfer to be achieved without using any electrostatic force. Therefore, no ozone is caused and the efficiency of toner transfer cannot be influenced by humidity.

The transferring and fixing means 63 comprises the intermediate transferring unit 61, a heat roller 69, and a back roller 70. The common paper sheet 15 is carried along a passage shown by a broken line and toner is transferred and fixed on the common paper sheet 15 by the transferring and fixing means 63. The temperature of the heat roller 69 changes depending upon the process speed, but it is preferable to set this temperature about 50° C. higher than the melting point of toner. When a pressure of 0.4 to 1.0 Kgf/mm is added to the back platen 70, toner can be better transferred and fixed on the common paper sheet 15. As seen in the case of the transferring unit 62, the transferring and fixing means 63 enables toner transfer to be achieved without using any electrostatic force. Therefore, no ozone is caused and the efficiency of toner transfer cannot be influenced by humidity. In short, the transferring and fixing means can fulfill its function under any circumstances.

The recording operation of the image forming apparatus shown in FIG. 8 will be described. Toner remaining on the picture element electrodes is cleaned by the fur brush cleaner while carrying the electrostatic latent image forming unit 10 in the direction shown by the arrow at a speed of 15 mm/sec. An electrostatic latent image is formed by the latent image forming operation shown in FIGS. 6A and 6B before the electrostatic latent image forming unit 20 reaches the contact type developing unit 60 which serves as developing means and uses conductive magnetic toner. A voltage of 50 V is applied from the recording power source 40 to the capacitors 32 and the electrostatic latent image thus formed has an image area having a potential of about 50 V and a non-image area having a potential lower than 10 V. When the latent image reaches the developing region of the developing unit 60, its image area potential becomes about 45 V. This latent image is developed while applying developing negative bias to it. The toner image is adhesion-transferred from the electrostatic latent image carrier 10 to the intermediate transferring means 61, which has been carried along the press roller 68, while adding a pressure of 0.8 Kg/cm to the roller 68. The intermediate transferring unit 61 is carried and passed between the heat roller 69, which has been heated to a temperature of 180° C., and the back platen 70, to which the pressure of 1.0 Kg/cm has been added, with the common paper sheet 15 seated on it. The toner image is thus transferred and fixed on the common paper sheet 15. The electrostatic latent image carrier 10 is returned to its original position after the toner image is transferred to the intermediate transferring unit 61.

Figure 9:
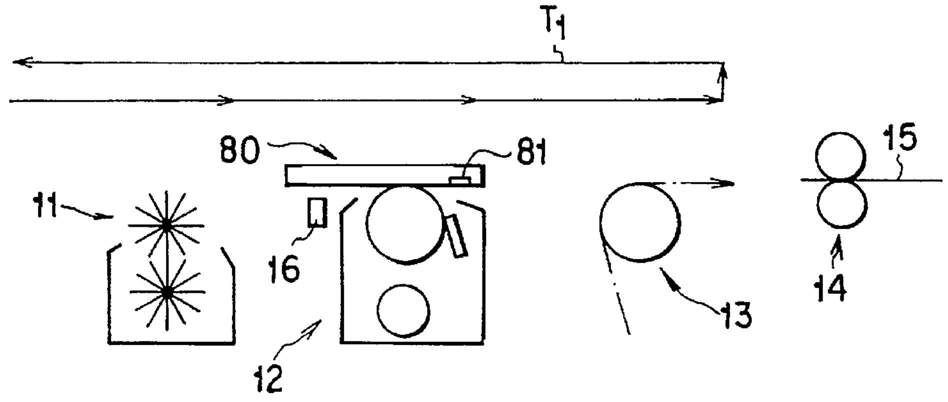
FIG. 9 schematically shows the structure of the image forming apparatus according to a further embodiment of the present invention.

FIG. 9 schematically shows the image forming apparatus according to a further embodiment of the present invention. Reference numeral 80 represents an electrostatic latent image carrier provided with a position marker 81 which will be described later, 11 the fur brush cleaner for cleaning toner on the electrostatic latent image carrier 80, 12 the contact type developing unit which serves as developing means and uses non-magnetic one component toner, 13 the transferring roller unit which serves as toner transferring means, 14 the heat roller which serves as fixing means, 15 the common paper sheet which serves as image recorded medium, and 16 a sensor for detecting the position marker 81. The electrostatic latent image carrier 80 is carried by a carrying roller (not shown) when this roller is driven by a step motor (not shown). Same component as those in FIG. 2 will be described only when needed.

Figure 10:
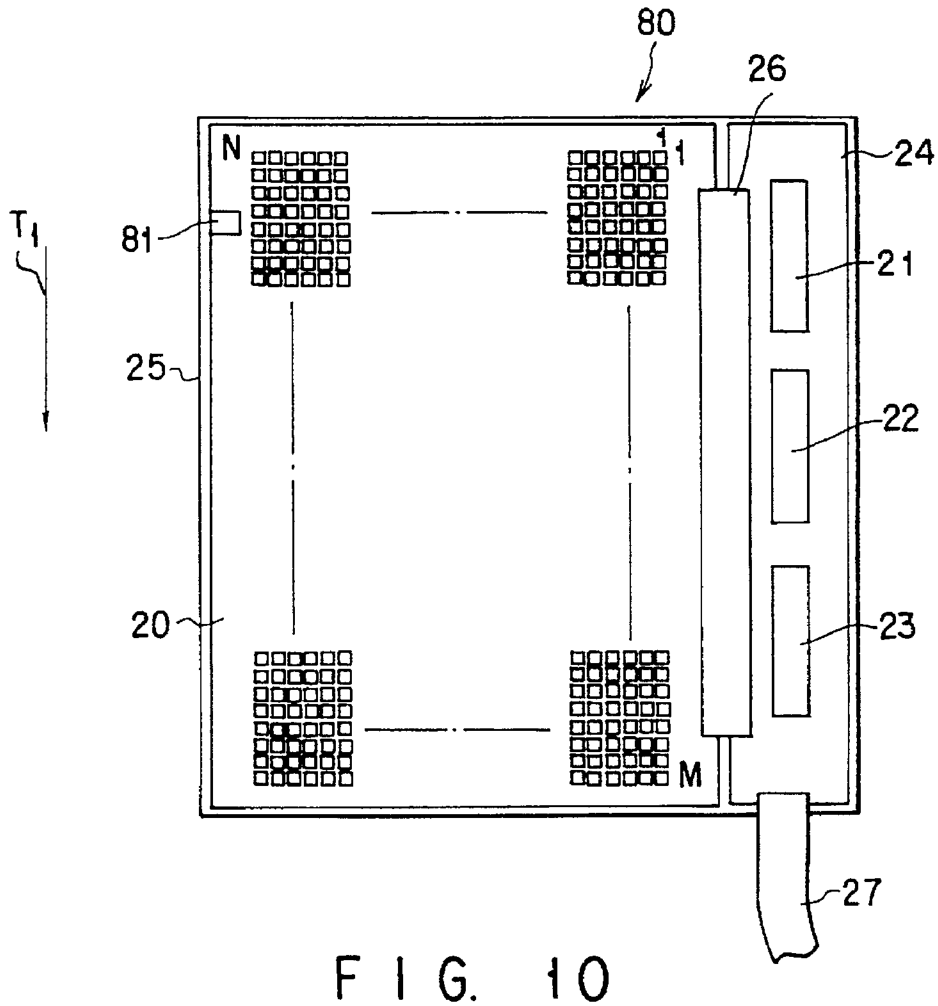
FIG. 10 is a plan schematically showing an electrostatic latent image carrier of the image forming apparatus in FIG. 9.

The electrostatic latent image carrier 80 will be described referring to FIG. 10. It comprises the above-described electrostatic latent image forming unit 20, the drive circuit board 24 and the position marker 81, all of which are arranged on the support 25. The drive circuit board 24 includes the data storing section 21 comprising the shift register and the latch circuit for storing recording information to be applied to the transistors, the transistor selecting section 22 comprising the selector and the counter for selecting any desired line of the transistors, and the driver section 23 for matrix-driving the transistors. The electrostatic latent image forming unit 20 and the plate 24 are connected to each other by the lead line 26 to form same circuitry as that shown in FIG. 5. The electrostatic latent image carrier 80 is connected to the power source and the circuit arranged outside through the flexible cable 27.

The image forming operation of the image forming apparatus shown in FIGS. 9 and 10 will be described with reference to a timing chart shown in FIGS. 11A through 11L.

Figure 11:
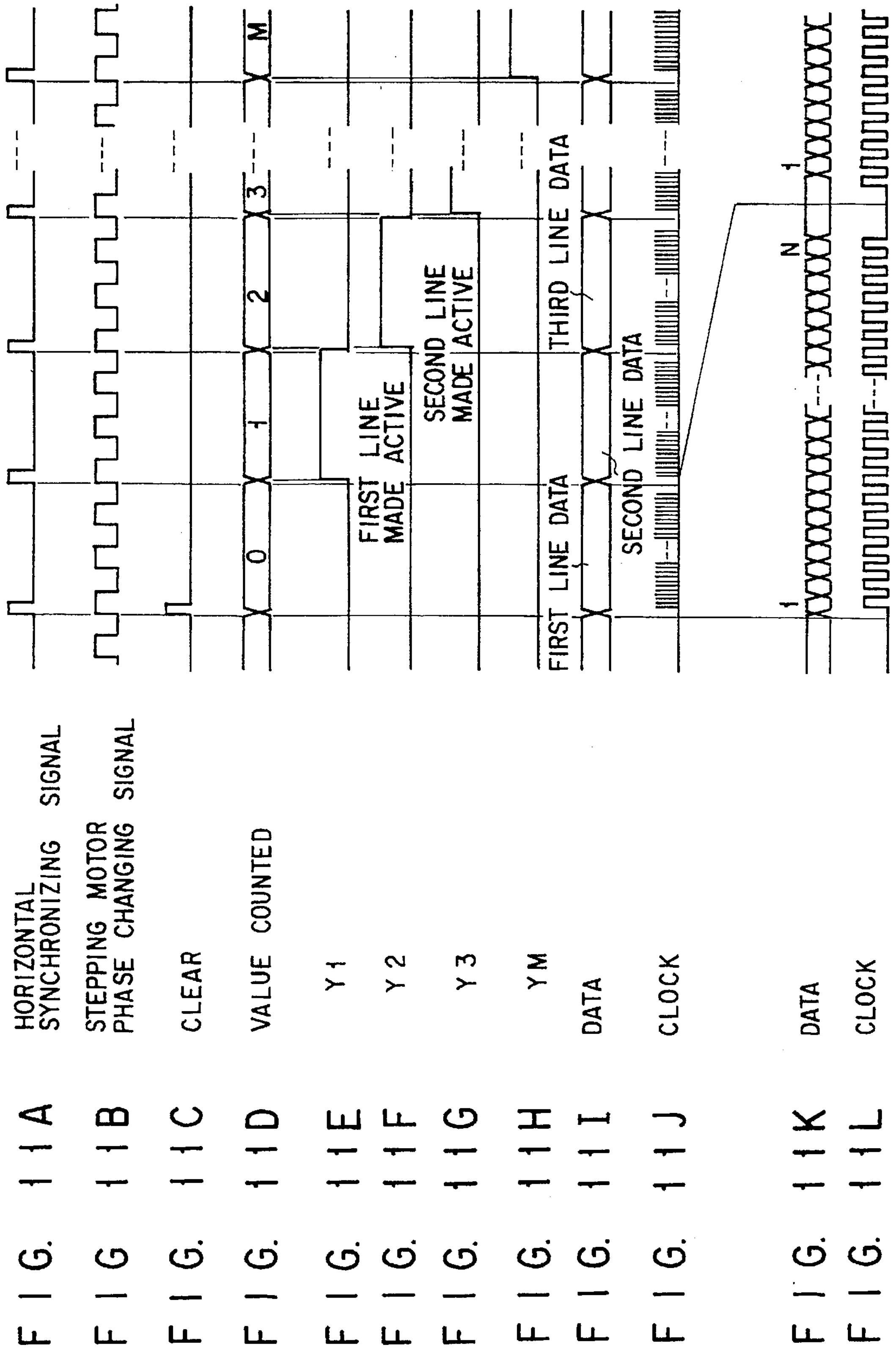
FIGS. 11A through 11L are wave form diagrams intended to explain the image forming operation of the image forming apparatus in FIG. 9.

FIG. 11A shows horizontal synchronizing signal which serves as a reference when image data is transferred to one line transistors in the main scanning direction. FIG. 11B shows stepping motor phase changing signal for driving the stepping motor. The stepping motor is rotated one step, responsive to one pulse (or cycle) of stepping motor phase changing signal. This stepping motor phase changing signal is synchronized with the above-mentioned horizontal synchronizing signal and as apparent from FIGS. 11A and 11B, the stepping motor is rotated three steps every cycle of the horizontal synchronizing signal. As the stepping motor is rotated three steps, the electrostatic latent image carrier 80 is carried only same distance as the pitch of the picture element electrodes arranged in the carrier carrying or sub-scanning direction. Clear signal shown in FIG. 11C is generated synchronizing with the horizontal synchronizing signal and responsive to signal output applied from the sensor 16 to represent that the position mark of the electrostatic latent image carrier is detected. When this clear signal is applied to the counter 18, the counter 18 is cleared zero as shown in FIG. 11D and the latch circuit 19 shown in FIG. 5 is also cleared.

When the electrostatic latent image carrier 80 is carried to pass over the developing unit 12, the sensor 16 detects the position mark 81 of the electrostatic latent image carrier 80. Positions of the sensor 16 and the position mark 81 are set in such a way that detection output can be obtained from the sensor 16 before the picture element electrodes 33 of the electrostatic latent image forming unit 20 come into the developing region of the developing unit 12. Clear signal is applied synchronizing with that timing which is previously set to respond to the detection signal applied from the sensor 16 and at which the first line picture element electrodes 33 come into the developing region.

At the same time when clear signal is applied as shown in FIG. 11C and synchronizing with clock as shown in FIG. 11J, the transferring of first line image data to the shift resister is started as shown in FIG. 11I. This transferring of first line image data is finished during the time when the value of the counter 18 is made zero, as shown in FIGS. 11D and 11I. As apparent from FIGS. 11K and 11L which are enlarged views showing data and clock, one line image data are N units which equal to the number of picture element electrodes arranged on the electrostatic latent image forming unit 20 in the main scanning direction.

When next horizontal synchronizing signal is applied as shown in FIG. 11A, the value of the counter 18 is counted up by one, as shown in FIG. 11D, and the first line image data transferred to the shift register are latched by the latch circuit 19 at the timing at which the counter 18 is counted up. That signal line of those (X1, X2, and X3, - - - ) connected to sources of transistors 31 to which image data signal of mark information has been applied are changed from low to high in level. Those signal lines to which image data signal of space information has been applied are kept low in level, as shown in FIGS. 11F and 11H. During the time when the value of the counter 18 is kept 1, second line image data are transferred to the shift register 29. Thereafter, the value of the counter 18 is counted up every time horizontal synchronizing signal is applied.

As the counter 18 is counted up, the selector 17 successively changes the scanning lines, which are connected to gates 34 of transistors 31, from low to high in level, as shown in FIGS. 11E through 11H. When the value of the counter 18 is zero, the scanning lines are left low in level. When it is counted up from zero to one, the scanning line Y1 shown in FIG. 5 are changed high in level and thus made active or operative. Those of the first scanning line transistors whose source electrodes 37 have been changed high connected to these transistors 31 are charged, and voltage (or electrostatic latent image potential) which corresponds to that of the source electrodes 37 thus appears in the picture element electrodes 33. When electrostatic latent image potential is appeared in the picture element electrodes 33, these picture element electrodes 33 are moved and positioned in the developing region of the developing unit 12 by the stepping motor. Toner is thus caused to adhere to the picture element electrodes 33 because of potential difference between the picture element electrodes 33 and the developing roller of the developing unit 12. When source electrodes 37 of those transistors 31 which are connected to the first scanning line are kept low in level, capacitors 42 which are connected to these transistors 31 are not charged, no voltage is added to the picture element electrodes 33, and potential difference is not caused to enable toner development.

Responsive to next horizontal synchronizing signal, those line image data which correspond to the second scanning line are latched by the latch circuit 19, the counter 18 is counted up from one to two, and another part of the electrostatic latent image is similarly formed in those picture element electrodes 33 which are connected to the second scanning line, and developed by toner. This process is repeated and all parts of the electrostatic latent image are thus formed and developed by toner.

As described above, image data transferred to the shift register 29 control the signal lines which are connected to sources of the transistors 31 and the value of the counter 18 by which horizontal synchrosignal is counted controls the scanning lines which are connected to gates of the transistors 31.

Even when potential in the picture element electrodes 33 is controlled responsive to image data, as described above, that in the capacitors changes as time goes by. In addition, it is supposed that electric charges are moved at the time of development. It is therefore ideal and preferable that potential on the surfaces of the capacitors is controlled just before or at the same time the development is conducted. According to the above-described embodiment of the present invention, the position mark 81 is arranged at a part of the electrostatic latent image carrier 80 and it is detected by the sensor 16. The transistors of those picture element electrodes 33 which have reached the developing region of the developing unit 12 are driven and the forming and developing of an electrostatic latent image are carried out at the same time. These forming and developing of the electrostatic latent image can be therefore more reliably conducted at the same time before potential in the capacitor is changed as time goes by.

Figure 12:
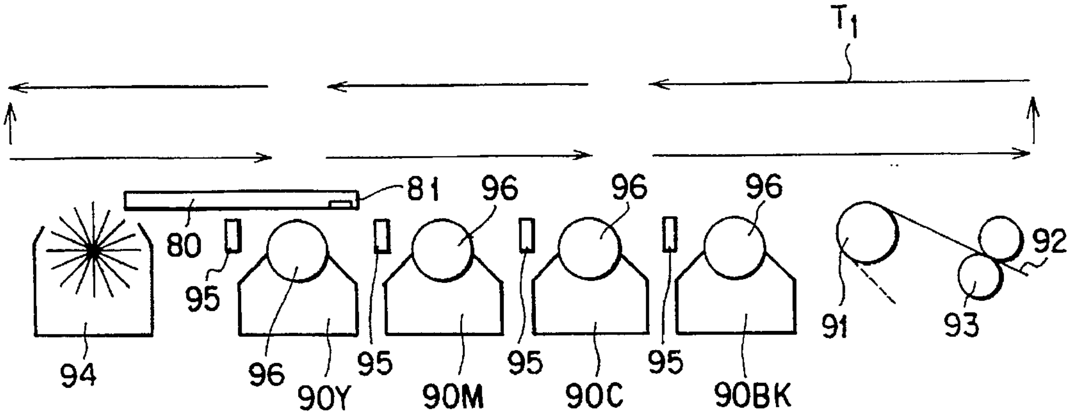
FIG. 12 schematically shows the structure of the image forming apparatus according to a still further embodiment of the present invention.

The color image forming apparatus according to a still further embodiment of the present invention is shown in FIG. 12. Reference numeral 80 represents the electrostatic latent image carrier, 90Y, 90M, 90C and 90BK yellow, magenta, cyanic and black developing units of the non-contact type, 91 roller for forming part of transferring means and serving to transfer a toner image onto a recording medium 92 when toner image transferring voltage is applied to it, 93 heat rollers which serve as fixing means, 94 a cleaner, and 95 sensors for detecting the position marker 81. The electrostatic latent image carrier 80 is carried in a direction shown by arrows by carrying rollers (not shown) and a step motor (not shown) which drives the carrying rollers.

Each of the non-contact developing units 90Y, 90M, 90C and 90BK uses two-component developer consisting of insulating magnetic carriers and insulating non-magnetic toner which is charged positive. Yellow toner is used by the developing unit 90Y, magenta toner by the developing unit 90M, cyanic toner by the developing unit 90*c* and black toner by the developing unit 90BK. Each of these developing units has a developing roller 96. This developing roller 96 is a metal sleeve which houses a rotating magnet roller therein and whose surface is coated with the developer. It is positioned not to contact its toner with the electrostatic latent image carrier 80 and toner is caused to fly from it to an electrostatic latent image on the electrostatic latent image carrier 80 which has potential lower than or reverse in polarity to that of developing bias. This developing unit will become more apparent from Jpn. Pat. Appln. KOKAI Publication No. 59-121077 and others.

The toner image transferring roller 91 is an elastic one having a conductive surface layer. The surface of the roller 91 is made of such material as has smoothness and low friction so as to make it easy to remove matters such as toner and paper powder from the roller 91. It is made of conductive polyfluoride resin or polyester in the case of this embodiment. When a toner image is to be transferred, the roller 91 is pressed against the underside of the recording medium 92 to transfer the toner image from the electrostatic latent image carrier 80 to the recording medium 92 while applying AC bias, reverse in polarity to toner, from a power source (not shown) to the roller 91. The amount of ozone caused by this transferring roller 91 is smaller than a several tenth of that caused by the corona charger. In addition, the toner image transferring characteristic of the roller 91 can be made more stable even under humid circumstances. The surface of the roller 91 is made clean by cleaner means (not shown) because the toner image cannot be uniformly transferred to the recording medium 92 when the surface thereof is made uneven by paper powder and others adhering to it. The toner image which has been transferred to the recording medium 92 is fixed on it by the heat rollers 93.

It will be described how a color image is formed by the color image forming apparatus shown in FIG. 12. Toner remaining on the picture element electrodes 33 is made clean by the fur brush cleaner 94 while moving the electrostatic latent image carrier 80 in the direction T1. Voltage is applied from the recording power source to the group of source electrodes of the electrostatic latent image forming unit before the electrostatic latent image carrier 80 comes into the developing region of the yellow developing unit 90Y. When it is carried into the developing region of the yellow developing unit 90Y, an electrostatic latent image is formed there, responsive to yellow image signal, and the image thus formed is developed at the same time by yellow toner which has been charged negative.

The electrostatic latent image carrier 80 on which the yellow toner image is carried is then carried to the next magenta developing unit 90M. When its picture element electrodes are thus carried into the developing region of the magenta developing unit 90M, a magenta electrostatic latent image is formed there by the multi-developing operation which will be described later, and the magenta image thus formed is developed at the same time by magenta toner, overlapping the yellow image already formed. Cyanic and black toner images are then successively multi-developed by the cyanic and black developing units 90C and 90BK and a color toner image is formed on it.

According to this color image forming apparatus, plural developing operations are applied from the plural developing units to the electrostatic latent image carrier 80. This becomes possible because potential can be controlled every line of the picture element electrodes on the electrostatic latent image carrier 80.

The electrostatic latent image carrier 80 is pressed against the underside of the recording medium 92 carried around the image transferring roller 91, to which +300 V has been applied, and the color toner image is thus transferred from the electrostatic latent image carrier 80 to the recording medium 92. The color toner image is then fixed on the recording medium 92 by the heat rollers 93. The electrostatic latent image carrier 80 is returned to its original position after the color toner image is transferred from it to the recording medium 92.

Mono-color development by the color image forming apparatus shown in FIG. 12 is conducted at the same timings as described referring to FIGS. 11A through 11L. Detailed description on these operation timings will be therefore omitted.

Figures 13A, 13B:
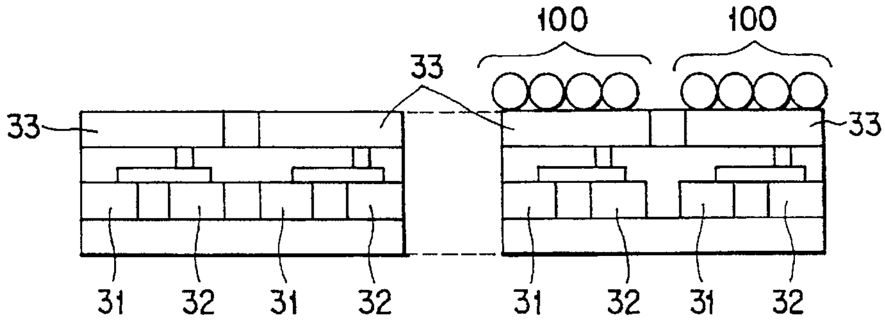
FIGS. 13A through 13D are intended to explain the multi-developing operation of the image forming apparatus in FIG. 12.
Figures 13C, 13D:
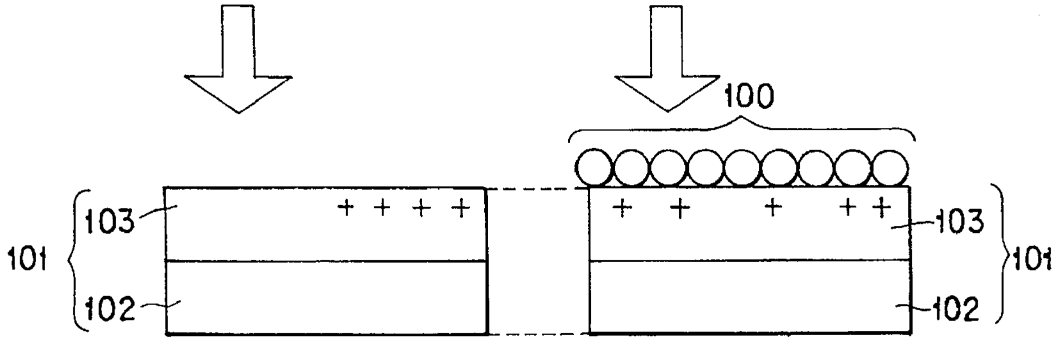

Referring to FIGS. 13A through 13D, it will be described how electrostatic latent images are formed by multi-development which is achieved while repeating mono-color development. FIGS. 13A and 13B schematically show how an electrostatic latent image is formed according to the invention. FIG. 13A shows no toner image formed on the electrostatic latent image forming unit and FIG. 13B shows a toner image formed on it. Same reference numerals in FIGS. 13A through 13D as those in FIG. 4 denote same components and description on these components will be omitted accordingly. Reference numeral 100 represent toner. FIGS. 13C and 13D schematically show how an electrostatic latent image is formed by the conventional apparatus in which the photosensitive matter or layer is used, and they correspond to FIGS. 13A and 13B. In FIGS. 13C and 13D, the photosensitive matter 101 comprises a conductive substrate 102 and a photosensitive layer 103 formed on the conductive substrate 102, and reference numeral 100 denotes toner. FIG. 13C shows the photosensitive face on which no toner image is formed, and only the left area of it is exposed as shown by an arrow. FIG. 13D shows the photosensitive face on which a toner image has been formed, and only the left area of it is exposed as shown by an arrow.

In the case of the image forming apparatus according to the present invention, potentials in all of the picture element electrodes become same, as described above, before an electrostatic latent image is formed. This does not depend upon whether or not toner is present on the picture element electrodes. The transistors 31 are driven, responsive to image data applied, and latent image potential appears in the picture element electrodes 33 at the image forming area of the latent image forming unit 20. This latent image potential is determined by potential of the capacitors. The capacitors are charged at certain voltages by the corresponding transistors 31 which are driven responsive to image data applied. The image potential is independent of whether or not toner is present on the picture element electrodes. In the case of the image forming apparatus of the present invention, therefore, certain contrast potential can be obtained independent of whether or not toner is present on the picture element electrodes, the amount of toner present, and how many times the development is repeated. In addition, access can be gained every unit (comprising the transistor 31, the capacitor 32 and the picture element electrode 33) of the electrostatic latent image forming unit 20. Even when two or more colors image data represent a same picture dot position, that unit of the electrostatic latent image forming unit 20 which corresponds to this picture dot position can be driven every time these image data are applied. In short, multi-color toner images can be formed on same picture dot positions of the electrostatic latent image forming unit 20, responsive to multi-color image data applied. As the result, multi-development can be achieved without causing any shear in color printing.

Referring to FIGS. 13C and 13C, it will be described for comparison how an electrostatic latent image is formed by conventional multi-development by which organic or inorganic photoconductor such as Se is used as the electrostatic latent image forming unit.

In the case of the conventional image forming apparatus, the photosensitive face of the photosensitive layer 103 is charged (charged loads are denoted by +) by the corona charger arranged above the photosensitive layer 103 before the latent image is exposed. That area of the photosensitive face which has been developed by toner is charged through the toner. Charged potential difference is therefore caused between this area of the photosensitive face which is shielded by the toner, as shown in FIG. 13D, and that area thereof which is not shielded by any toner, as shown in FIG. 13C. When image exposure is conducted relative to the photosensitive matter 101 from the photosensitive layer side thereof, therefore, light can be irradiated to the photosensitive face without hindrance and electric charges can be completely vanished in the case of that area of the photosensitive face which has no toner thereon as shown in FIG. 13C. As the result, predetermined contrast potential can be obtained relative to the area of the photosensitive face which is not exposed. In the case of the photosensitive face which has been developed by toner as shown in FIG. 13D, however, light is irradiated to the photosensitive face through the toner. Because light is shielded by the toner, the light intensity which is irradiated to the photosensitive face is attenuated. Even if image exposure is conducted by light having same intensity, therefore, the attenuation of charged potential is made less in the case of the toner-developed photosensitive face, as compared with the photosensitive face which is not developed by toner. Even if charging and image exposing are carried out under same conditions, therefore, potential or contrast potential difference is caused between the electrostatic latent image and its background, depending upon whether or not toner is present on the photosensitive face. The contrast potential becomes smaller accordingly, as toner on the photosensitive face becomes thicker and more in amount.

As apparent from the above, image density becomes different, depending upon the thickness of toner by which the photosensitive face is developed, in the case of the conventional image forming apparatus when development is further conducted after it is repeated several times. In the case of the image forming apparatus according to the present invention as already described above, however, any desired image density can be obtained independent of toner present on the photosensitive face.

Although the forming of electrostatic latent image has been conducted, in the case of the embodiments shown in FIGS. 1, 8, 9 and 12, when the electrostatic latent image forming unit is in the developing area of the developing means, it may be conducted just before the electrostatic latent image forming unit comes into this developing region.

Figure 14:
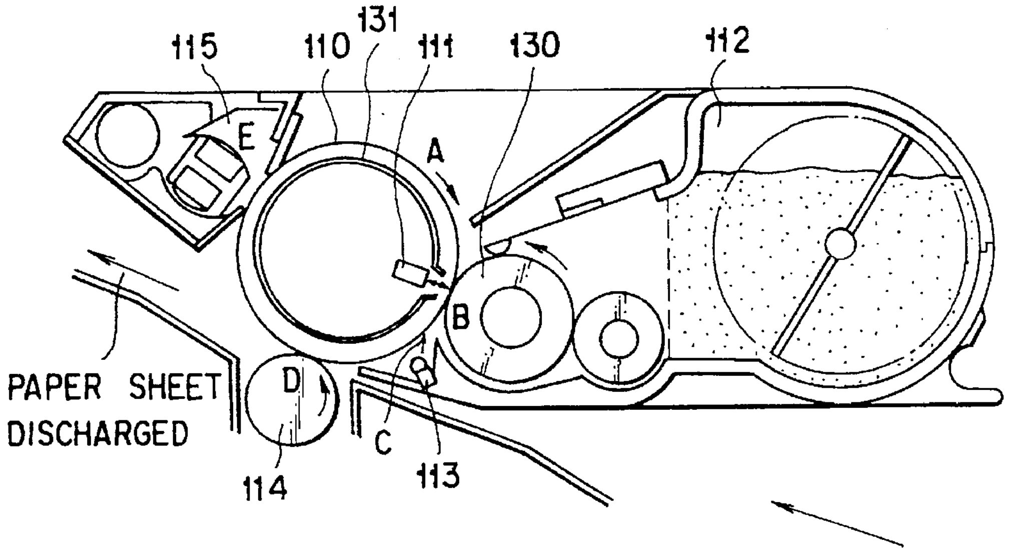
FIG. 14 schematically shows the structure of the image forming apparatus according to a still further embodiment of the present invention.
Figure 15:
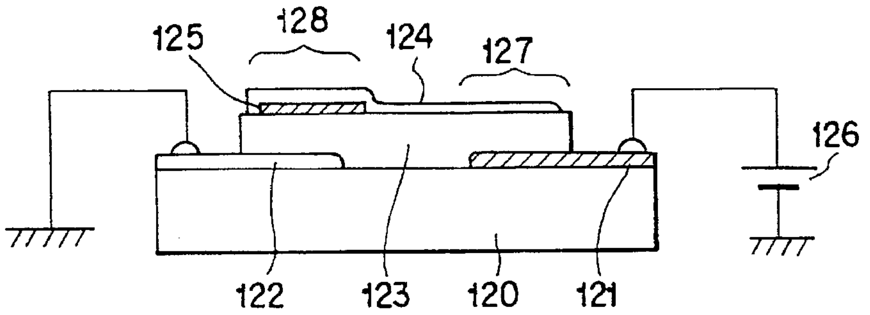
FIG. 15 is a sectional view schematically showing an electrostatic latent image forming unit of the image forming apparatus in FIG. 14.
Figure 16:
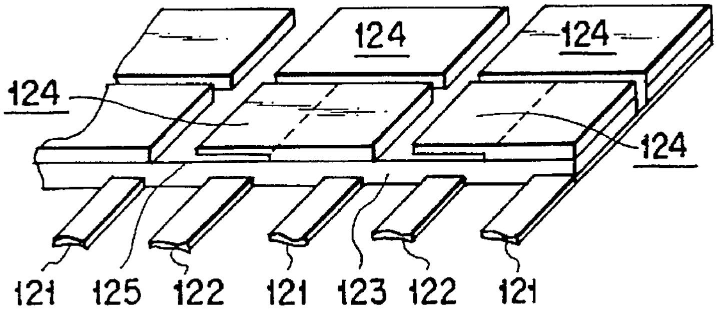
FIG. 16 is a perspective view schematically showing the electrostatic latent image forming unit of the image forming apparatus in FIG. 14.

The image forming apparatus according to a still further embodiment of the present invention is shown in FIGS. 14, 15 and 16.

In FIG. 14, reference numeral 110 represents an electrostatic latent image forming drum which will be described later, 111 an LED light writing head, 112 a developing unit of the contact type in which non-magnetic one component toner is used, 113 a potential control lamp, 114 an image transferring roller, and 115 a cleaner.

Referring to FIGS. 15 and 16, at will be described how an electrostatic latent image is formed by the image forming apparatus shown in FIG. 14. FIG. 15 schematically shows a photoelectric converter which is a unit of the electrostatic latent image forming unit. Reference numeral 120 denotes a light permeable substrate, 121 a light shielding electrode, and 122 a light permeable electrode. The light permeable and shielding electrodes 121 and 122 form a first electrode. Reference numeral 123 represents a photoconductive layer and 124 an islet-shaped light permeable electrode which serves as a second electrode and which has a conductive light shielding matter 125 corresponding to the first light permeable electrode 122. Reference numeral 126 represents a power source. This power source 126 is connected to the light shielding electrode 121 and the light permeable electrode 122 is connected to the ground. The light shielding electrode 121, the photoconductive layer 123 and the light permeable electrode 124 form a first functional section 127 and the light permeable electrode 122, the photoconductive layer 123 and the conductive light shielding matter 125 form a second functional section 128. In the case of this photoelectric converter, the two functional sections each having the structure of electrode/photoconductive layer/electrode can serve as a capacitor element and also as a photoconductive element, depending upon the direction in which light enters into the substrate.

The electrostatic latent image forming unit is made as follows. A thin film of chromium, 2 μm thick, is vapor-deposited on a cylindrical glass substrate (Corning 705) which has been washed. The electrodes 121 each having a width of 30 μm are formed at a pitch of 125 μm according to PEP. They are connected to one another at one ends thereof to form an external terminal connected to the power source 126. ITO film, 2 μm thick, is further formed and the electrodes 122 are formed in same manner according to PEP as seen in the case of the electrodes 121, interposing a space of 40 μm between the electrodes 121 and 122. Amorphous silicon film is then formed, 20 μm thick, on them according to plasma CVD to form the photoconductive layer 123. A thin film of chromium is again vapor-deposited, 1 μm thick, to form each of the islet-shaped electrodes 125 on the electrode 122 and the photoconductive layer 123. ITO film is again formed, 2 μm thick, on them and this ITO film is then patterned at a pitch of 125 μm to form the light permeable picture element electrodes 124 each shaped like a rectangle of 100 μm on the electrodes 125 and the photoconductive layers 123 on the electrodes 121. The electrodes 121 and 122 are connected to the power source 126 and the ground, respectively, through their external connection terminals.

The electrostatic latent image forming operation of the electrostatic latent image forming unit will be described, paying attention to the operation of the photoelectric converter shown in FIG. 15, because this converter is a fundamental component of the electrostatic latent image forming unit.

Figure 17:
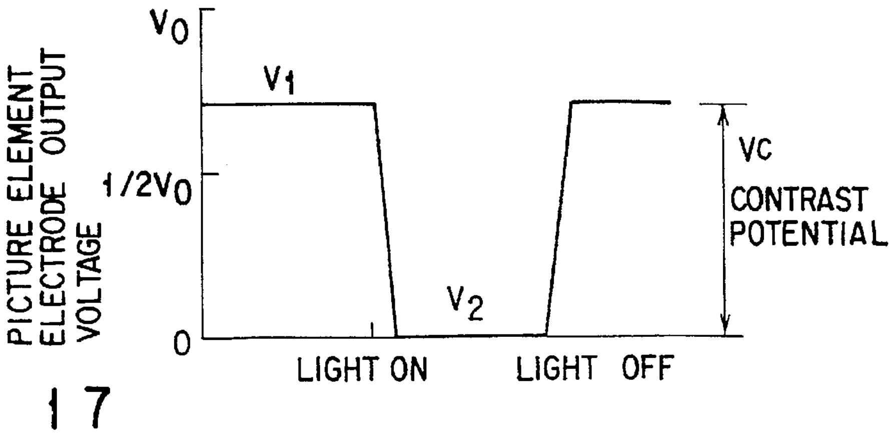
FIG. 17 is a graph intended to explain the electrostatic latent image forming operation of the electrostatic latent image forming unit in FIGS. 15 and 16.

When the first functional section 127 is used as the capacitor element and the second functional one 128 as the photoconductive element, these capacitor and photoconductive elements 127 and 128 are connected in series and voltage $V_0$ is applied to the series circuit thereof. A potential on a node between the capacitor 127 and the photoconductive element 128 correspond to that of the picture element electrode 124. The contrast of picture element electrodes which is caused depending upon whether or not light enters into the photoconductive elements 128 becomes the potential of an electrostatic image when light image is converted into the electrostatic image. No charge is added to the capacitor element and picture element electrode potential is substantially zero volt at initial stage. Voltage $V_0$ is supplied from the power source 126 to the photoconductive and capacitor elements 128 and 127 under black state. The photoconductive element 128 also functions as an insulator because circumstances are kept black. Voltage is therefore distributed to the photoconductive layer of the photoconductive element, the photoconductive layer of capacitor element and the photoconductive layer being sandwiched between the electrodes 121 and 122 according to their capacities. In the case of the present invention, however, the gap between the electrodes 121 and 122 is made larger than the thickness of the photoconductive layer 123. Most of the voltage added is therefore distributed to the photoconductive and capacitor elements. The electrostatic capacity of the capacitor element 127 is designed to become larger than that of the photoconductive element 128. Voltage $V_1$ distributed to the photoconductive element 128, therefore, becomes larger than ½ of $V_0$, as shown in FIG. 17, and this voltage appears in the picture element electrode.

When light enters into the light permeable substrate 120 from the rear side thereof, it is shielded at the photoconductive layer of the capacitor element 127 by the light shielding electrode 121, but it is allowed to come into that of the photoconductive element 128 through the light permeable electrode 122. The photoconductive layer which forms the photoconductive element 128 is thus made conductive. Voltage applied to the picture element electrode is converted from $V_1$, which appears in it before light enters into it, to $V_2$, which is near the ground potential, as shown in FIG. 17. The time constant of this conversion is determined mainly by the time constant of the photoconductive layer. When no light enters into the substrate 120, the potential of the picture element electrode 124 is left $V_1$. Contrast potential Vc can be thus obtained as follows, depending upon whether or not light enters into the substrate 120 ($Vc=V_1-V_2$). Light image can be converted into electrostatic image in this manner by the photoelectric converters. After the entering of light is finished, the potential of each of the picture element electrodes is returned $V_1$ because $V_0$ is added to each of them.

It is also possible that contrast potential is controlled while controlling the energy of light entering into the photoconductive elements. It is well-known that the extent to which each of the photoconductive elements is made conductive is different, depending upon the energy of incident light. The description made above is related to the case where each of the photoconductive elements is made completely conductive and voltage added from the power source is applied to each of the capacitor elements without any drop in voltage. When the energy of light entering into the photoconductive element is controlled and this photoconductive element serves as a resistant component, voltage applied to the capacitor element becomes equal to the difference between power source voltage $V_0$ and voltage distributed to the photoconductive element. Therefore, voltage larger than $V_2$ appears in the picture element electrode and contrast voltage is decreased. Electrostatic image potential can be changed or converted in this manner by the photoelectric converter, responsive to the energy of incident light.

The liquid crystal shutter head, the EL head of pedion light-emitting type, or the optical fiber array head can be used as the light writing head.

The developing unit of the contact type in which non-magnetic one component toner is used, and the image transferring roller have been described above and no more description will be added about them, accordingly.

The image forming process achieved by this image forming apparatus will be described.

FIG. 14 shows an arrangement of the electrostatic latent image forming drum (which will be hereinafter referred to as drum) and related parts or unit. Alphabets A–E denotes positions around the drum. The drum 110 is rotated clockwise in FIG. 14. A developing roller 130 of the developing unit 112 is arranged to contact the outer face of the drum 110 at the position B and the LED writing head 111 is arranged in the drum 110 to face the developing roller 130. When an image is to be formed, toner is carried to that outer surface area of the drum 110, which is contacted with the developing roller 130, by the developing roller 130. Every time the light-emitting section (not shown) of the writing head 111 is made on and off relative to picture elements, responsive to image data, latent image formation and toner development are carried out at the same time.

The toner image thus developed on the drum 110 is carried to the image transferring position D as the drum 110 is rotated. The drum 110 is uniformly exposed (at the position C and near it) during this time by the lamp 113. The toner image on the drum 110 is transferred to the common paper sheet (not shown) at the image transferring position by the image transferring roller 114 to which bias has been added via the common paper sheet. The toner image transferred to the common paper sheet is fixed by the fixing unit (not shown) and the common paper sheet on which the toner image has thus been fixed is then discharged from the apparatus. Toner still remaining on the drum 110 after the image transferring stage is collected at the position E by the cleaner 115. To add more, a shielding member 131 is arranged along the inner face of the drum 110 to shield light emitted from both of the lamp 113 and the writing head 111.

It will be described how the potential of the picture cell electrode is changed during the above-described image forming process.

Figure 18A:
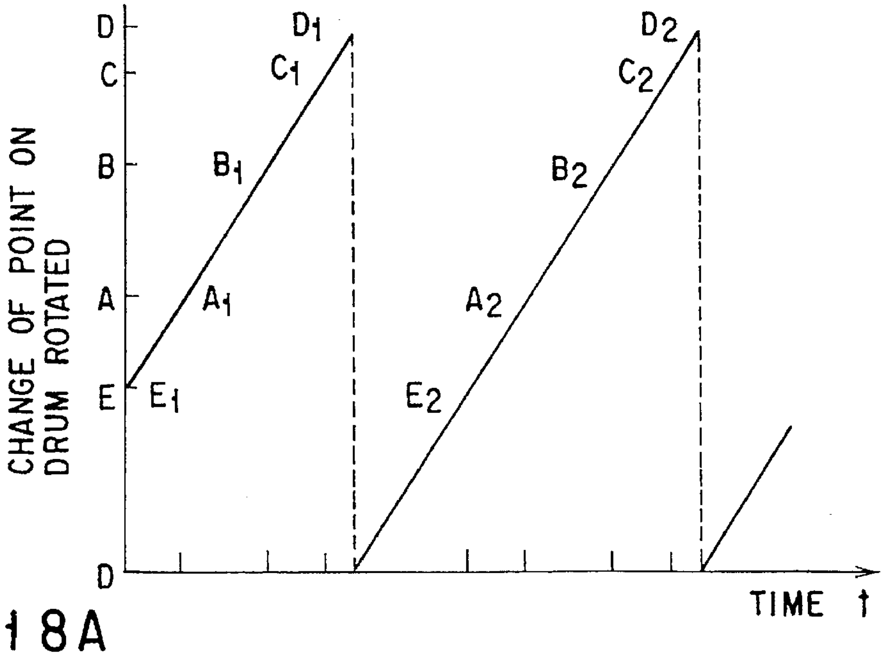
FIGS. 18A and 18B are graphs intended to explain the image forming operation of the image forming apparatus in FIG. 14.
Figure 18B:
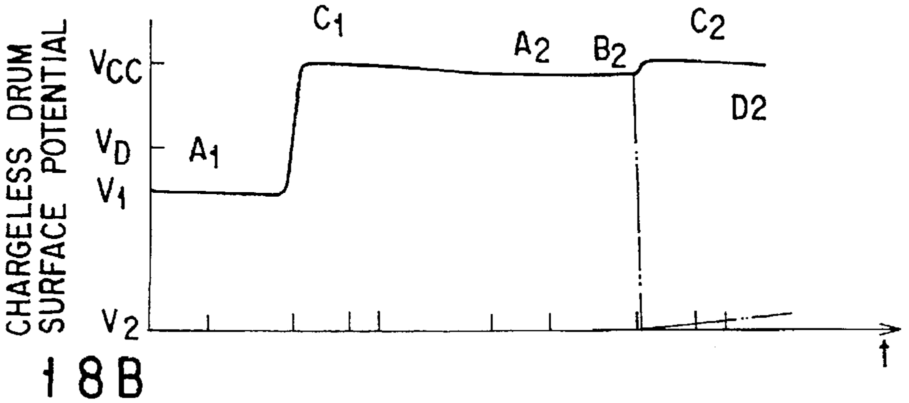

FIG. 18A shows how the position of an optional point on the drum is changed relative to positions around the drum as time goes by, and FIG. 18B shows how surface potentials of the picture cell electrodes at the optional point on the drum is changed relative to time. The positions around the drum are plotted on the vertical axis of the graph shown in FIG. 18A and potentials of the picture cell electrodes on the vertical axis of the graph shown in FIG. 18B. Time is plotted on the horizontal axes of these graphs shown in FIGS. 18A and 18B. Attention is now paid to a point on the drum and to the position $E_1$ in FIG. 18A. As the drum is rotated and time goes by, the point on the drum passes positions $E_1$, $A_1$, $B_1$, $C_1$, $D_1$ and again positions $E_2$, $A_2$, $B_2$, $C_2$, $D_2$, as shown in FIG. 18A. Just after the rotation of the drum is started, potentials of the picture cell electrodes of the drum which is not exposed by the lamp are maintained at background potential VC1, as shown FIG. 18B (see $A_1$), which has been described with reference to FIG. 17. After the point on the drum passes the position $B_1$ in FIG. 18A, the potential is changed to voltage $V_o$, which is supplied from the power source 126, by the exposure of the lamp 113 (see $C_1$ in FIG. 18B). As the point on the drum comes out of the exposing light of the lamp, the surface potentials of the picture cell electrodes are attenuated. When it passes positions $A_2$ and $B_2$ again, however, the surface potential is made again $V_o$ by the exposure of the lamp 113. When electric latent image forming unit is exposed at the position $B_2$ by the writing head, the picture cell electrode potentials thus exposed are attenuated to a potential $V_2$. When potential VD needed to develop toner is applied, as a bias voltage, to the developing roller at this time, toner is transferred from the developing roller to the picture cell electrodes to develop the image on the drum. The rising of image area potential $V_2$ caused by the exposure of the lamp has a enough contrast in respect to the background potential $V_1$ by the light-shielding effect of developed toner until the point on the drum passes the image transferring position $D_2$. The blurring of image caused by the image transfer can be thus avoided.

As apparent from the above, image formation can be made without using any ozone-generating charger.

Figure 19:
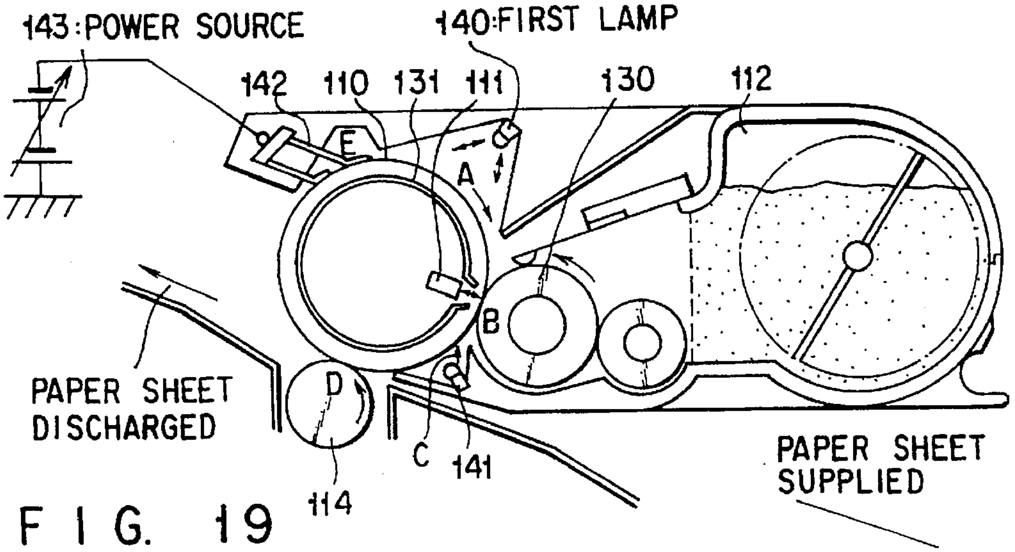
FIG. 19 schematically shows the structure of the image forming apparatus according to a still further embodiment of the present invention.

FIG. 19 is a sectional view showing the image forming apparatus according to a still further embodiment of the present invention.

Reference numeral 110 represents the electrostatic latent image forming drum same in structure as that of the image forming apparatus shown in FIG. 14. Reference numeral 111 denotes the LED light writing head, 140 a first exposing lamp, 112 the developing unit of the contact type in which non-magnetic one component toner is used, 141 a second exposing lamp, 114 the image transferring roller, and 142 a brush. Same components as those shown in FIG. 14 function in same manner and description on these components will be therefore made only when needed. An LED array, for example, is used as lamps 140 and 141.

The image forming process achieved by the image forming apparatus shown in FIG. 19 will be described.

FIG. 19 shows the electrostatic latent image forming drum (which will be hereinafter referred to as drum) and its surroundings and alphabets in FIG. 19 represent positions around the drum. The drum is rotated clockwise in FIG. 19. The developing roller 130 of the developing unit 112 is arranged to contact the drum 110 at the position B and the LED light writing head 111 is arranged in the drum to face the developing roller 130. Toner is carried to that area of the drum, which is contacted with the developing roller, at the time of image formation by the developing roller and every time the light-emitting section (not shown) of the writing head 111 is made on and off relative to picture elements of the drum, responsive to image data, latent image formation and toner development are carried out at the same time on the drum surface.

The toner image thus developed on the drum 110 is carried to the image transferring position D as the drum 110 is rotated. The drum is uniformly exposed (at the position C and near it) during this time by second lamp 141. The toner image is transferred to the paper sheet at the image transferring position by the image transferring roller 114 to which bias has been added through the paper sheet. The toner image thus transferred to the paper sheet is fixed by the fixing unit (not shown) and the paper sheet is then discharged from the apparatus. Toner still remaining on the drum even after the image transfer is collected by the cleanerless process in such a way that current supplied from a power source 143 is injected, as electric charges, into toner through the brush 142 at the position E, that toner having electric charges is uniformly exposed at the position A by the first lamp 140 and that it is again collected at the position B by the developing roller 130. The light shielding member 131 is also arranged along the inner face of the drum 110 to shield light emitted the lamps and writing head.

It will be described how drum surface potential is changed during the above-described image forming process.

Figure 20A:
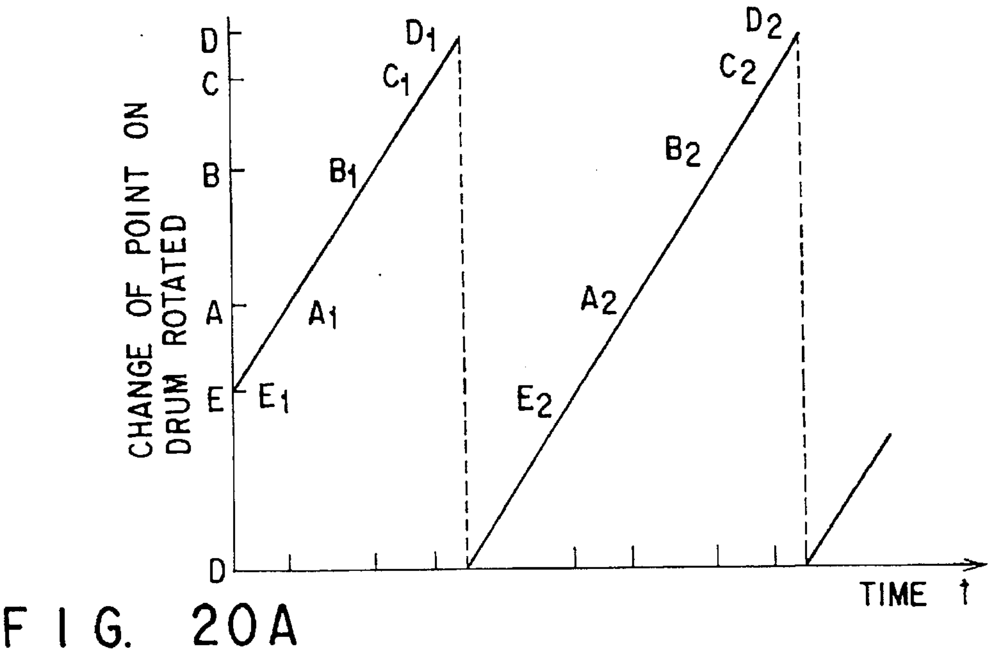
FIGS. 20A and 20B are graphs intended to explain the image forming operation of the image forming apparatus in FIG. 19.
Figure 20B:
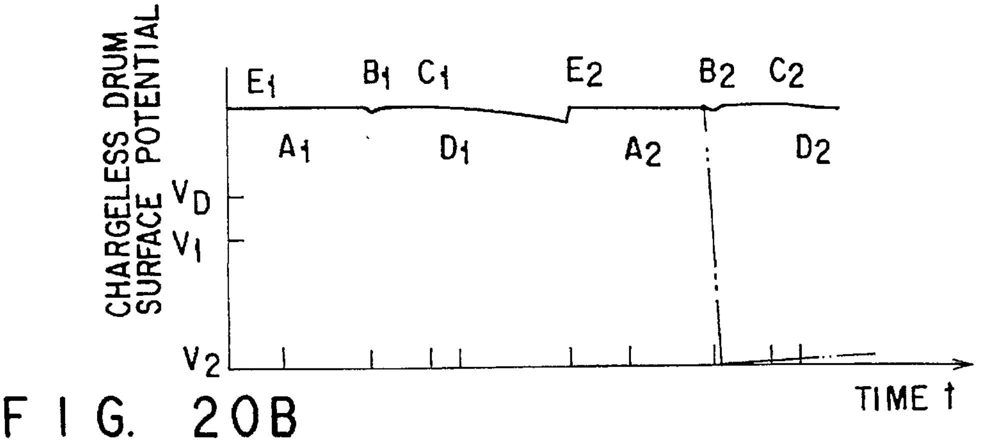

FIG. 20A shows the positional change of an optional point on the drum relative to time and FIG. 20B shows the change of potentials of the picture cell electrodes as the point on the drum moves together with the lapse of time. Positions around the picture cell electrodes are plotted on the vertical axis of the graph shown in FIG. 20A and potentials of the picture cell electrodes on the vertical axis of the graph shown in FIG. 20B. Time is plotted on horizontal axes of the graphs shown in FIGS. 20A and 20B. Attention is now paid to a point on the drum and a position $E_1$ in FIG. 20A. As the drum is rotated and time goes by, the point on the drum passes positions $E_1$, $A_1$, $B_1$, $C_1$, $D_1$ and again positions $E_2$, $A_2$, $B_2$, $C_2$, $D_2$. Just after the rotation of the drum is started, potential of the picture cell electrode becomes $V_o$, equal to voltage supplied from the power source 143*b*, because that area is uniformly exposed by the first lamp 140 (see $E_1$ in FIG. 20B). Potential is then little or less attenuated because light from the first and second lamps 140, 141 is shielded a the position $B_1$ by the developing roller. When the point on the drum passes over the position $B_1$, however, potential is returned $V_o$ at once because the area on is exposed by the second lamp 141. As the point comes out of the exposing light of the second lamp, the potential is attenuated. When it passes over the position $E_2$ again, the potential is made $V_o$ due to the first lamp 140. When the latent image forming unit is exposed at the position $B_2$ by the writing head, a potential of the forming unit is attenuated to $V_2$. When image area potential vp needed to develop toner has been applied, as a bias voltage, to the developing roller at this time, toner is moved from the developing roller to the picture cell electrodes to develop the image on the picture cell electrodes. The rising of potential $V_2$ of the electrodes created when the electrodes are exposed by the second lamp 141 can be kept enough to have a contrast in respect to the background potential $V_o$ by the light-shielding effect of developed toner until the point on the drum comes to the image transferring position $D_2$. The blurring of image caused when the developed image on the drum is transferred to the paper sheet can be thus avoided.

Toner still remaining on the drum even after the image transfer has been charged reverse in polarity. It is, therefore, that electric charges are injected through the brush to which the bias voltage is applied, at the position E (or $E_2$) to become normal in polarity. It is then collected at the position B by the developing roller. In the case of this embodiment, brush bias for injecting the electric charges into toner at the position E, and drum supply voltage are set equal to prevent the drum from receiving and supplying current.

As apparent from the above, image formation can be carried out without using any ozone-generating charger.

Figure 21:
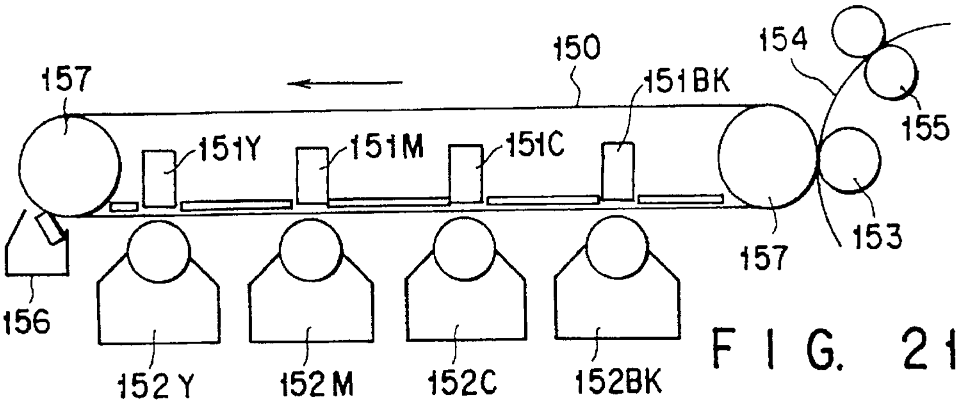
FIG. 21 schematically shows the structure of the image forming apparatus according to a still further embodiment of the present invention.
Figure 22:
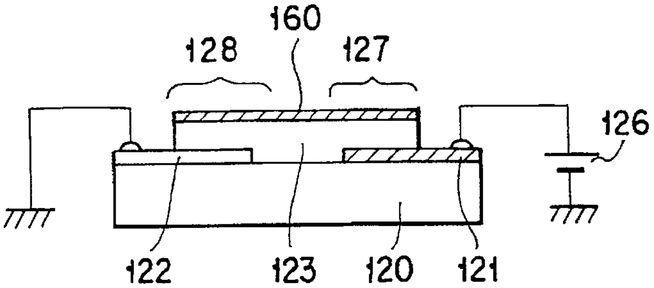
FIG. 22 is a sectional view schematically showing an electrostatic latent image forming unit of the image forming apparatus in FIG. 21.

FIG. 21 shows the image forming apparatus according to a still further embodiment of the present invention. Reference numeral 150 denotes an electrostatic latent image forming unit which is formed by shaping the above-mentioned one like an endless belt. FIG. 22 shows a unit of fundamental components of the electrostatic latent image forming unit. This unit of fundamental components is different from that shown in FIG. 15 in that a picture element electrode 160 serves as the light shielding electrode and that the light shielding electrode 125 in FIG. 15 is not therefore used. The latent image forming operation achieved, however, is same as that achieved by the apparatus shown in FIG. 15.

Reference numerals 151Y, 151M, 151C and 151BK represent light writing heads for image-exposing the electrostatic latent image forming unit 150, responsive to yellow, magenta, cyanic and black image information, 152Y, 152M, 152C and 152BK yellow, magenta, cyanic and black developing units of the non-contact type, 153 an image transferring roller which forms a part of image transferring means and to which image transferring voltage is applied to transfer a toner image to a recording medium 154, 155 a heat roller which serves as fixing means, and 156 a cleaner. The electrostatic latent image forming unit 150 is carried in a direction shown by an arrow by drums 157 connected to drive means (not shown).

Each of the light writing heads 151 is an LED line recording head, in which LED elements of 1024 units are arranged on a line at a density of 8 elements/mm. A cell fox lens array is positioned in the light-emitting direction of the LED elements to collect light from them as a spot, which has a size of about 100 μm, onto the photoelectric converters of the electrostatic latent image forming unit 150. The LED elements in each of the LED line recording heads 151 are selectively driven, responsive to recording information applied from recording information supply means (not shown), to image-expose the photoelectric converters of the electrostatic latent image forming unit 150 from their rear side.

The liquid crystal shutter head, the edge emitter type light emitting EL head, the fluorescent tube array head or the optical fiber array head may be used as the light writing one.

Each of the non-contact developing units 152 and the image transferring roller 153 are same in function and structure as those shown in FIG. 12.

The image transferring roller 153 is supported detachable from the electrostatic latent image forming belt 150. In short, it is pressed against the belt 150 only when a toner image is to be transferred to the recording medium, and it is released from the belt 150 at the other time. When the image transfer is to be conducted, the roller 153 is pressed against the underside of the electrostatic latent image forming belt 150 and AC bias which has been biased reverse to the polarity (+) of toner is applied from a power source (not shown) to the image transferring roller 153. The toner image is thus transferred from the electrostatic latent image forming belt 150 to the recording medium 154. The amount of ozone generated by this image transferring roller unit is made smaller than a several tenths of that generated by the corona charger and the image transferring characteristic of this roller can be kept more stable even under humid circumstances. The image transferring roller is cleaned by cleaner means (not shown) because the toner image cannot be uniformly transferred when that face of the roller which is pressed against the belt 150 is made unenven by paper powder and others adhering to the roller.

The image forming operation of the image forming apparatus will be described with reference to FIG. 21.

DC voltage of +400 V is added to the electrostatic latent image forming belt 150 prior to the image forming operation. When voltage applied in this manner, potentials of all of picture element electrodes (not shown) of the electrostatic latent image forming belt 150 become about 300 V. The picture element electrode face of the electrostatic latent image forming belt 150 is cleaned by the cleaner 156 as the belt 150 is carried in the direction shown by the arrow. The picture element electrodes of the belt 150 are then carried to a yellow toner image forming station which comprises the LED line recording head 151Y and the yellow developing unit 152Y. The electrostatic latent image forming belt 150 is exposed every line by the LED line recording head 151Y which emits light from its light permeable substrate (not shown), responsive to yellow image information applied. Potential of each of those picture element electrodes which correspond to the exposed photoelectric converters is made about 30 V because these picture elements are made operative as described with reference to FIG. 16. At the same time when this electrostatic latent image is formed, yellow toner is floated from the developing sleeve (not shown) of the developing unit 152Y to those picture element electrodes, to which developing bias formed by superposing AC 300 V to DC +250 V has been added, to develop the electrostatic latent image. A yellow toner image is thus formed. This toner development is continued while the belt 150 is exposed by the head 151Y. When the exposure is finished, potential of each of the picture element electrodes is returned about 300 V. In short, all of the picture element electrodes are returned to have initial potential, independently of whatever history the belt 150 exposed may have and whether or not any toner image is present on it.

The electrostatic latent image forming belt 150 which has the yellow toner image formed on its picture element electrodes is then carried to a magenta toner image forming station which comprises the LED line recording head 151M and the magenta developing unit 152M. A magenta toner image is multi-developed there on the yellow toner image by the same operation as seen at the yellow toner image forming station.

Figures 23A, 23B:
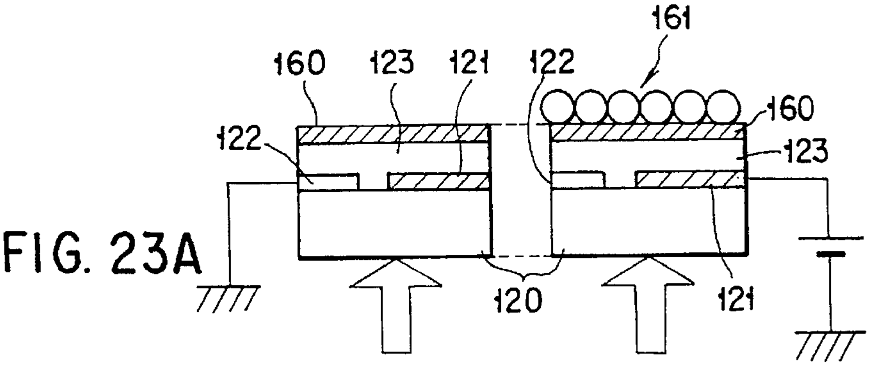
FIGS. 23A through 23D are intended to explain the multi-developing operation of the image forming apparatus in FIG. 21.
Figures 23C, 23D:
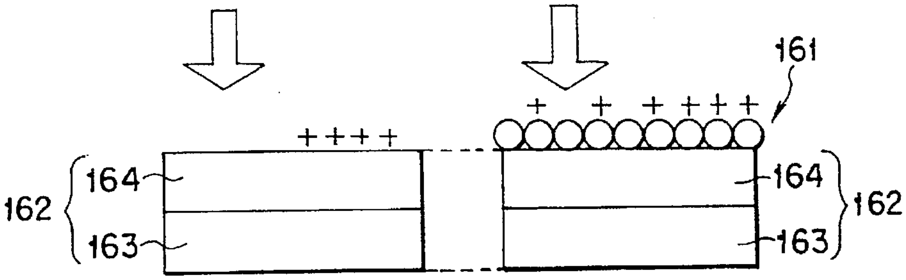

Referring to FIGS. 23A and 23B, it will be described how the electrostatic latent image forming operation of the image forming apparatus shown in FIGS. 21 and 22 is conducted at the multi-developing time. FIGS. 23A and 23B schematically show how an electrostatic latent image is formed at the image exposing time by the image forming apparatus of the present invention. FIG. 23A shows the photoelectric converter on which no toner image is formed and FIG. 23B the photoelectric converter on which the toner image is formed. Same components as those shown in FIG. 22 function in same manner and description on these components will be therefore made only when needed. Reference numeral 161 represents toner particles and arrows denote incident light for exposing the whole of the photoelectric converter. FIGS. 23C and 23D schematically show how an electrostatic latent image is formed by the conventional apparatus. A photosensitive matter or member 162 comprises a conductive substrate 163 and a photosensitive layer 164 formed on the conductive substrate 163. Reference numeral 161 denotes toner particles. FIG. 23C shows no toner image formed on the photosensitive face and only the left area of the photosensitive face is exposed as shown by an arrow. FIG. 23D shows the toner image formed on the photosensitive face and only the left area of the photosensitive face is also exposed as shown by an arrow.

Potentials of the picture element electrodes become same, before the picture element electrodes are exposed, independently of whether or not the toner image is present on them. This is because potentials appearing in them depend upon only voltage supplied from outside, as described above, and because certain voltage is supplied to them at least until the image is exposed and developed. On the other hand, the image exposure is conducted not through the toner image and the strength of light entering into the photoconductive layer 123 is therefore made same independently of whether or not toner is present on the picture element electrodes. Potentials of the picture element electrodes image-exposed to form the electrostatic latent image is thus made same independently of whether or not toner is present on the picture element electrodes. Further, picture element electrode potentials and image exposing light strength do not depend upon the state on the picture element electrodes before these electrodes are exposed. Same thing can be therefore said about potentials appearing in the picture element electrodes, however different the thickness of toner on them may be. In the case of the image forming apparatus according to the present invention, therefore, contrast potential can be obtained, corresponding to the strength of image exposing light, but independently of whether or not toner is present on the picture element electrodes, the amount of toner present on them and how many times they are developed. Furthermore, potentials of those picture element electrodes which are not image-exposed are determined only by voltage supplied from outside. Their potentials can be therefore made same at all times, independently of whether or not toner is present on them, the amount of toner present on them and how many times they are developed. Development can be thus conducted with same contrast potential by the image forming apparatus of the present invention.

Referring to FIGS. 23C and 23D, it will be described for comparison how electrostatic latent image formation is conducted by the multi-development when the conventional organic or inorganic photoconductor such as Se is used as the electrostatic latent image forming unit.

The face of the photosensitive layer 164 is charged (charged loads are schematically denoted by +) by the corona charger arranged above the photosensitive layer 164 before it is image-exposed. The photosensitive face on which developed toner particles are present is charged through the toner particles. Charged potential at that part of the photosensitive face which is coated with toner, therefore, becomes different from the one at the other part thereof which is not coated with toner. Image exposure is then applied to the photosensitive member 162 from the side of its photosensitive layer 164. In the case of the photosensitive face on which not toner particle is present (FIG. 23C), light irradiates it without any hindrance and charged loads are completely lost. Predetermined contrast potential can be thus obtained relative to that part of it which is not exposed.

In the case of the photosensitive face on which developed toner particles are present, as shown in FIG. 23D, light irradiates it through toner particles. The strength of irradiated light is thus attenuated because light is shielded by toner particles. Even when image-exposed by light of same strength, therefore, the attenuation of charged potential becomes smaller in the case of the toner-present photosensitive face, as compared with the case of the toner-not-present photosensitive face. Even when charging and image exposing are carried out under same conditions, therefore, potential of the electrostatic latent image becomes different from that of the back-ground, or contrast potentials becomes different, depending upon whether or not toner particles are present on the photosensitive face. As the thickness and amount of toner particles present on the photosensitive face become larger, the difference of contrast potentials becomes smaller.

As apparent from the above, image density becomes different, depending upon the thickness of developed toner layer, when development is further conducted after it is repeated several times in the case of the conventional apparatus. According to the image forming apparatus of the present invention, however, any desired image density can be obtained independently of developed toner particles.

According to the present invention, electrostatic latent image formation can be achieved without using any ozone-generating pre-charger. In addition, an image forming apparatus which uses no corona charger can be provided. Further, an image forming apparatus which generates quite a few or no ozone can be provided. In short, an image forming apparatus which uses the chargeless color electronic photographing process can be realized. Furthermore, images of high quality can be obtained without blurring them because the electrostatic latent image forming unit can keep its toner holding force even after the development. Still further, the development can be achieved with a higher reliability because electrostatic latent image formation is carried out at the developing region of the developing unit. Still further, any desired contrast potential can be obtained independently of how many times the electrostatic latent image forming unit is exposed. Multi-development can be realized with a more accurate image density.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electrostatic latent image forming member comprising a substrate having a plurality of potential maintaining bodies, arranged two-dimensionally on the substrate, for maintaining a desired potential required to form an electrostatic latent image thereon, each of the potential maintaining bodies including:

a first electrode for maintaining the desired potential;

charge maintaining means connectable to the first electrode, for maintaining predetermined charges;

switching means connected to the charge maintaining means, for carrying out an electrical switching operation to charge the charge maintaining means, the switching means including a second electrode to which an image signal is inputted;

a power source;

a third electrode to which a predetermined voltage is applied from the power supply;

connecting means for connecting the charge maintaining means and the third electrode; and means for connecting the third electrode and the connecting means based on the image signal inputted to the second electrode; and wherein the charge maintaining means includes a fourth electrode which is grounded and a fifth electrode connected to the first electrode, the fourth electrode and the fifth electrode being separated by a dielectric layer, for maintaining the desired potential by a switching operation of the switching means.

2. An electrostatic latent image forming member as in claim 1 wherein the charge maintaining means comprises a capacitor.

3. An electrostatic latent image forming member as in claim 1 wherein the plurality of potential maintaining bodies form a matrix.

4. An apparatus for forming a developer image based on image data comprising an electrostatic latent image forming member for forming an electrostatic latent image thereon, the electrostatic latent image forming member comprising a substrate and a plurality of potential maintaining bodies, provided two-dimensionally on the substrate, for maintaining a desired potential, each of the potential maintaining bodies including:

a first electrode for maintaining the desired potential;

charge maintaining means connectable to the first electrode, for maintaining predetermined charges; and switching means connected to the charge maintaining means, for carrying out an electric switching operation to charge the charge maintaining means, the switching means having a second electrode to which an image signal is inputted, a power source, a third electrode to which a predetermined voltage is applied from the power source, connecting means for connecting the charge maintaining means and the third electrode, and means for connecting the third electrode and connecting means based on the image signal inputted to the second electrode, wherein the charge maintaining means has a fourth electrode which is grounded and a fifth electrode which is connected to the first electrode, the fourth electrode and the fifth electrode being separated by a dielectric layer, for maintaining the desired potential by the switching operation of the switching means;

developing means for supplying a developing agent to the electrostatic latent image formed on the electrostatic latent image forming member; and transfer means for transferring a developed image formed by the developing means to a transfer target material.

5. An electrostatic latent image forming member as in claim 4 wherein the charge maintaining means comprises a capacitor.

6. An electrostatic latent image forming member as in claim 4 wherein the plurality of potential maintaining bodies form a matrix.

7. An apparatus for forming a developer image based on an image data comprising an electrostatic latent image forming means for receiving an electrostatic image, which includes a substrate having a plurality of potential maintaining members thereon, provided two-dimensionally on the substrate, for maintaining a desired potential to form an electrostatic latent image thereon, the potential maintaining members including:

a first electrode;

charge maintaining means connectable to the first electrode, for maintaining predetermined charges thereon;

switching means, connected to the charge maintaining means, for carrying out an electrical switching operation to charge the charge maintaining means;

wherein the switching means includes a second electrode to which an image signal is inputted, a power source, a third electrode to which a predetermined voltage is applied from the power source, connecting means for selectively connecting the charge maintaining means and the third electrode, based upon the image signal inputted to the second electrode;

wherein the charge maintaining means has a fourth electrode which is grounded and a fifth electrode connected to the first electrode, the fourth electrode and the fifth electrode being separated by a dielectric layer, for maintaining the desired potential thereon by the switching operation of the switching means; and wherein said electrostatic latent image forming means further comprises first developing means for supplying a first color developing agent to the electrostatic latent image formed by the electrostatic latent image forming member, for forming a first developed image;

second developing means for supplying a second color developing agent to the electrostatic latent image formed by the electrostatic latent image forming member, for forming a second developed image; and third developing means for supplying a third color developing agent to the electrostatic latent image formed by the electrostatic latent image forming member, for forming a third developed image.

8. An electrostatic latent image forming member as in claim 7 wherein the charge maintaining means comprises a capacitor.

9. An electrostatic latent image forming member as in claim 7 wherein the plurality of potential maintaining bodies form a matrix.

* * * * *